United States Patent
Jung et al.

(10) Patent No.: US 11,677,097 B2
(45) Date of Patent: Jun. 13, 2023

(54) SOLID ELECTROLYTE, METHOD OF PREPARING THE SAME, AND ELECTROCHEMICAL DEVICE INCLUDING THE SAME

(71) Applicant: Samsung Electronics Co., Ltd., Suwon-si (KR)

(72) Inventors: Sungkyun Jung, Suwon-si (KR); Hyeokjo Gwon, Hwaseong-si (KR); Gabin Yoon, Seoul (KR); Jusik Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 99 days.

(21) Appl. No.: 17/335,173

(22) Filed: Jun. 1, 2021

(65) Prior Publication Data
US 2021/0376378 A1  Dec. 2, 2021

(30) Foreign Application Priority Data

Jun. 2, 2020 (KR) .................. 10-2020-0066524
Jun. 1, 2021 (KR) .................. 10-2021-0070877

(51) Int. Cl.
*H01M 10/0562* (2010.01)
*H01M 4/134* (2010.01)
*H01M 4/02* (2006.01)

(52) U.S. Cl.
CPC ........ *H01M 10/0562* (2013.01); *H01M 4/134* (2013.01); *H01M 2004/027* (2013.01); *H01M 2300/008* (2013.01)

(58) Field of Classification Search
CPC ............ H01M 10/0562; H01M 4/134; H01M 2004/027; H01M 2300/008; H01M 2008/128

(Continued)

(56) References Cited

U.S. PATENT DOCUMENTS 4,074,019 A  2/1978 Malachesky et al.
6,402,795 B1  6/2002 Chu et al.
(Continued)

FOREIGN PATENT DOCUMENTS

CN  106887639 A  6/2017
CN  107425218 A  12/2017
(Continued)

OTHER PUBLICATIONS

European Search Report for European Patent Application No. 21177179.5 dated Oct. 29, 2021.
(Continued)

*Primary Examiner* — James M Erwin
(74) *Attorney, Agent, or Firm* — Cantor Colburn LLP

(57) ABSTRACT

A solid electrolyte including a compound represented by Formula 1 or 3, the compound having a glass transition temperature of −30° C. or less, and a glass or glass-ceramic structure, $$AQX\text{—}Ga_{1-z}M_{z1}(F_{1-k}Cl_k)_{3-3z}Z_{3z1} \qquad \text{Formula 1}$$

wherein, in Formula 1,
Q is Li or a combination of Li and Na, K, or a combination thereof,
M is a trivalent cation, or a combination thereof,
X is a halogen other than F, pseudohalogen, OH, or a combination thereof,
Z is a monovalent anion, or a combination thereof,
1<A<5, 0≤z≤1, 0≤z1≤1, and 0≤k<1, $$AQX\text{-}aM_{z1}Z_{3z1}\text{-}bGa_{1-z}(F_{1-k}Cl_k)_{3-3z} \qquad \text{Formula 3}$$

wherein, in Formula 3, Q is Li or a combination of Li and Na, K, or a combination thereof;
M is a trivalent cation, or a combination thereof,
X is a halogen other than F, pseudohalogen, OH, or a combination thereof, (Continued)

Z is a monovalent anion, or a combination thereof, $0<a\leq 1$, $0<b\leq 1$, $0<a+b$, $a+b=4-A$, $1<A<5$, $0\leq z<1$, $0\leq z1\leq 1$, and $0\leq k<1$.

37 Claims, 20 Drawing Sheets

(58) Field of Classification Search
USPC .......................................................... 429/323
See application file for complete search history.

(56) References Cited

U.S. PATENT DOCUMENTS

| | | | |
|---|---|---|---|
| 6,485,622 | B1 | 11/2002 | Fu |
| 7,901,658 | B2 | 3/2011 | Weppner et al. |
| 8,828,580 | B2 | 9/2014 | Visco et al. |
| 2013/0048924 | A1 | 2/2013 | Amatucci et al. |
| 2015/0255830 | A1* | 9/2015 | Matsui .................. H01M 4/364 429/339 |
| 2018/0006326 | A1 | 1/2018 | O'Neill et al. |
| 2019/0036159 | A1* | 1/2019 | Kim ...................... H01M 4/525 |
| 2019/0097267 | A1* | 3/2019 | Yokoyama ............... H01B 1/08 |
| 2019/0260068 | A1* | 8/2019 | Yamamoto ........ H01M 10/0562 |
| 2019/0296391 | A1 | 9/2019 | Fujinoki |
| 2019/0296392 | A1 | 9/2019 | Fujinoki |
| 2019/0319240 | A1* | 10/2019 | Chen ................... H01M 50/489 |
| 2020/0075993 | A1 | 3/2020 | Ling et al. |
| 2020/0328459 | A1 | 10/2020 | Sakai et al. |

FOREIGN PATENT DOCUMENTS

| | | |
|---|---|---|
| CN | 109775744 A | 5/2019 |
| JP | 2006244734 A | 9/2006 |
| WO | 2019135319 A1 | 7/2019 |

OTHER PUBLICATIONS

Braga et al., "Glass-amorhous alikali-ion solid electrolytes and their performance in symmetrical cells", Energy & Environmental Science, 9, 2016, 948.

Hu et al., High-conductivity open framework fluorinated electrolyte bonded by solidified ionic liquid wires for solid-state Li metal batteries, Energy Storage Materials, 28, 2020, 37-46.

Tomita et al., "Substitution Effect for Br on the Lithium Ion Conductivity of Lithium Indium Bromide", ECS Transactions, 16(29), 2009, 137-141.

Tver'Yanovich et al., Glass-forming ability and cationic transport in gallium containing chalcohalide glasses, Journal of Non-Crystalline Solids, 256& 257, 1999, 237-241.

Wang et al, "Supporting Information—Lithium Chlorides and bromides as Promising Solid-State Chemistries for Fast Ion Conductors with Good Electrochemical Stability", Angew. Chem. Int. Ed, 2019, 58, 8039-8043.

Wang et al., "Lithium Chlorides and Bromides as Promising Solid-State Chemistries for Fast Ion Conductors with Good Elelctrochemical Stability", Angew.Chem. Int. Ed. , 58, 2019, 8039-8043.

* cited by examiner

SOLID ELECTROLYTE, METHOD OF PREPARING THE SAME, AND ELECTROCHEMICAL DEVICE INCLUDING THE SAME

CROSS-REFERENCE TO RELATED APPLICATION

This application claims priority to and the benefit of Korean Patent Application Nos. 10-2020-0066524, filed on Jun. 2, 2020, and 10-2021-0070877, filed on Jun. 1, 2021, in the Korean Intellectual Property Office, and all the benefits accruing therefrom under 35 U.S.C. § 119, the content of which is incorporated herein in its entirety by reference.

BACKGROUND

1. Field

The present disclosure relates to a solid electrolyte, a method of preparing the same, and an electrochemical device including the same.

2. Description of Related Art

A solid secondary battery includes a cathode, a solid electrolyte, and an anode. For the solid electrolyte among these components, high ionic conductivity is desired.

Solid electrolytes include sulfide solid electrolytes and oxide solid electrolytes. To use these solid electrolytes in a solid secondary battery, it is desirable to reduce grain boundaries between crystal particles of the solid electrolyte.

In a case of manufacturing a solid secondary battery using a sulfide solid electrolyte as a solid electrolyte, the solid secondary battery may be manufactured by pressing the sulfide solid electrolyte. Also, the solid secondary battery employing the sulfide solid electrolyte may produce toxic sulfide gas when exposed to the air. Accordingly, a sulfide solid electrolyte for a solid secondary battery would desirably provide improved manufacturability and have improved good stability in air.

In a case of manufacturing a solid secondary battery using an oxide solid electrolyte as a solid electrolyte, due to the physical characteristics of the oxide solid electrolyte, improvement in the uniformity of the interfacial adhesion between the solid electrolyte and a cathode is desired.

SUMMARY

Provided are a novel solid electrolyte and a method of preparing the same.

Provided is an electrochemical device including the solid electrolyte.

Provided is an electrochemical battery including the solid electrolyte.

Additional aspects will be set forth in part in the description which follows and, in part, will be apparent from the description, or may be learned by practice of the presented embodiments of the disclosure.

According to an aspect of an embodiment, there is provided a solid electrolyte including a compound represented by Formula 1 or Formula 3, wherein the compound represented by Formula 1 or Formula 3 has a glass transition temperature of −30° C. or less, and a glass or glass-ceramic structure:

$$AQX—Ga_{1-z}M_{z1}(F_{1-k}Cl_k)_{3-3z}Z_{3z1} \quad \text{Formula 1}$$

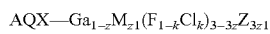

wherein, in Formula 1,
Q is Li or a combination of Li and Na, K, or a combination thereof,
M is a trivalent cation, or a combination thereof,
X is a halogen other than F, pseudohalogen, OH, or a combination thereof,
Z is a monovalent anion, or a combination thereof,
$1<A<5$, $0\le z<1$, $0\le z1\le 1$. and $0\le k<1$, or $$AQX\text{-}aM_{z1}Z_{3z1}\text{-}bGa_{1-z}(F_{1-k}Cl_k)_{3-3z} \quad \text{Formula 3}$$

wherein, in Formula 3, Q is Li or a combination of Li and Na, K, or a combination thereof;
M is a trivalent cation, or a combination thereof,
X is a halogen other than F, pseudohalogen, OH, or a combination thereof,
Z is a monovalent anion, or a combination thereof,
$0<a\le 1$, $0<b\le 1$, $0<a+b$, $a+b=4-A$, $1<A<5$, $0\le z<1$, $0\le z1\le 1$, and $0\le k<1$.

According to an aspect of another embodiment, there is provided a protected cathode comprising: a cathode; and a layer comprising the solid electrolyte of claim 1 on the cathode.

According to an aspect of another embodiment, there is provided an electrochemical device including the solid electrolyte.

According to an aspect of another embodiment, there is provided an electrochemical battery including: a cathode, an anode, and the solid electrolyte disposed between the cathode and the anode.

According to an aspect of another embodiment, there is provided a method of preparing the solid electrolyte, the method including: providing a mixture of QX and $Ga_{1-z}(F_{1-k}Cl_k)_{3-3z}$, a mixture of QX, $M_{z1}Z_{3z1}$, and $Ga_{1-z}(F_{1-k}Cl_k)_{3-3z}$, or a mixture of QX and $Ga_{1-z}M_{z1}(F_{1-k}Cl_k)_{3-3z}Z_{3z1}$; and mechanically milling the mixture to prepare a compound represented by the Formula 1 or 3.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
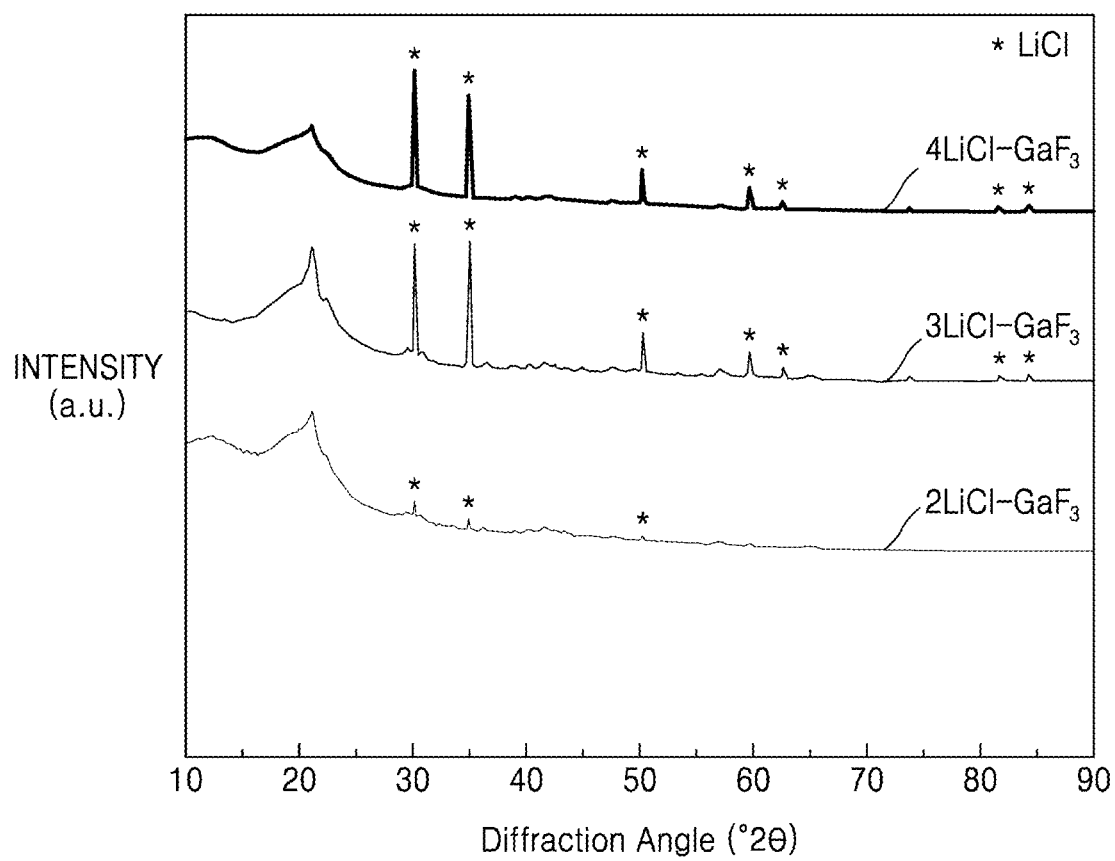
FIG. 1 is a graph of intensity (arbitrary units (a.u.)) versus diffraction angle (°2θ) and illustrates X-ray diffraction (XRD) spectra of compounds obtained according to Examples 1 to 3.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a solid electrolyte, a method of preparing the same, and an electrochemical device and an electrochemical battery, each including the solid electrolyte, will be described in greater detail.

According to an aspect, there is provided a solid electrolyte including a compound represented by Formula 1 or Formula 3, wherein the compound represented by Formula 1 or 3 has a glass transition temperature of −30° C. or lower and a glass or glass-ceramic structure,

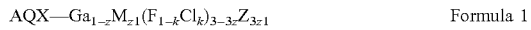

$$AQX-Ga_{1-z}M_{z1}(F_{1-k}Cl_k)_{3-3z}Z_{3z1} \quad \text{Formula 1}$$

wherein, in Formula 1,
Q is Li or a combination of Li and Na, K, or a combination thereof,
M is a trivalent cation, or a combination thereof,
X is a halogen other than F, pseudohalogen, OH, or a combination thereof,
Z is a monovalent anion, or a combination thereof,
$1<A<5$, $0 \leq z<1$, $0 \leq z1 \leq 1$. and $0 \leq k<1$, or

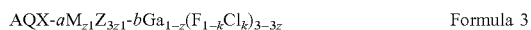

$$AQX-aM_{z1}Z_{3z1}-bGa_{1-z}(F_{1-k}Cl_k)_{3-3z} \quad \text{Formula 3}$$

wherein, in Formula 3, Q is Li or a combination of Li and Na, K, or a combination thereof;
M is a trivalent cation, or a combination thereof,
X is a halogen other than F, a pseudohalogen, OH, or a combination thereof,
Z is a monovalent anion, or a combination thereof,
$0<a \leq 1$, $0<b \leq 1$, $0<a+b$, $a+b=4-A$, $1<A<5$, $0 \leq z<1$, $0 \leq z1 \leq 1$, and $0 \leq k<1$.

The term "glass" used herein refers to an amorphous material exhibiting a glass transition phenomenon. The term "glass-ceramic" refers to a mixture of an amorphous material and at least one crystalline material. In the glass-ceramic, two components are observed, a glass phase (i.e., a glass phase or an amorphous phase) and a ceramic phase (i.e., a crystalline phase).

The compound of Formula 1 and a solid electrolyte including the same may exhibit a glass transition phenomenon, and the solid electrolyte may have a glass transition temperature that is lower than the operation temperature of a battery. Accordingly, it may be easy to form the solid electrolyte as desired.

The above-described glass transition phenomenon may be identified through differential scanning calorimetry (DSC) analysis. The compound of Formula 1 may have a glass transition temperature of about −40° C. or lower, −50° C. or lower, −60° C. or lower, or for example, about −60° C. to about −70° C., or about −40° C. to about −70° C., about −45° C. to about −65° C., or about −50° C. to about −60° C.

To manufacture a solid secondary battery having improved safety, development of a solid secondary battery employing an oxide solid electrolyte that is stable in the air is desired. However, and while not wanting to be bound by theory, it is understood that due to the hard physical properties of the oxide solid electrolyte, contact between the solid electrolyte and a cathode is not uniform at the interface thereof. To provide more uniform contact between the cathode and the oxide solid electrolyte, there has been suggested a high-temperature sintering process of the cathode and the oxide solid electrolyte.

However, when high-temperature sintering is used, providing the battery structure through total solidification of a solid secondary battery while also satisfying general characteristics of the battery has been difficult. To resolve these problems, it has been suggested to introduce an ionic liquid electrolyte between the oxide solid electrolyte and the cathode to allow the oxide solid electrolyte and the cathode to contact each other more uniformly. However, introducing an ionic liquid electrolyte according to this method may cause corrosion of a current collector by the ionic liquid electrolyte and complicate processes in designing a stacked structure of the battery.

Therefore, to solve the above-described problems, the inventors disclose a solid electrolyte including the compound represented by Formula 1 and having a glass or glass-ceramic structure.

The solid electrolyte according to an embodiment is a halogen compound-based solid electrolyte having good formability, and can be provided without use of a high pressure, which is used to manufacture a solid secondary battery using a sulfide solid electrolyte. When manufacturing a battery using the disclosed solid electrolyte, interfacial characteristics having improved uniformity between the solid electrolyte and a cathode are provided.

The compound of Formula 1 comprises gallium (Ga), fluorine (F), and a halogen other than F, and thus contain different halogens.

In Formula 1, M is an element having an oxidation number of +3, and may be for example, In, Sc, Al, Tl, Y, B, La, or a combination thereof, and Z may be a halogen, a pseudohalogen, or a combination thereof.

The term "oxidation number" used herein refers to an average oxidation number.

As used herein, the "pseudohalogen" is a molecule comprising two or more electronegative atoms and, like a halogen, generates a monovalent anion similar to a halogen ion. Examples of pseudohalogens are a cyanide (CN), a cyanate (OCN), a thiocyanate (SCN), an azide (N3), or OH.

In one or more embodiments, the solid electrolyte may have a water content of about 5 weight percent (wt %) or less, 0 wt %, or greater than 0 wt % and 5 wt % or less, based on a total weight of the solid electrolyte.

The solid electrolyte may have a water content of, for example, 0 wt %.

The term "water content" used herein refers to water present inside and/or on the surface of the solid electrolyte.

In a solid electrolyte which is sensitive to moisture, the absorbed moisture may decompose to produce a large amount of gas, and thus deteriorate the battery. Accordingly, it is common to reduce the content of moisture in the solid electrolyte.

However, in the solid electrolyte according to an embodiment, viscosity characteristics and conductivity may both be improved even when the water content is greater than 0 wt % and about 5 wt % or less, unlike other solid electrolytes.

The solid electrolyte may have a water content of about 0.1 wt % to about 5 wt %, about 0.5 wt % to about 5 wt %, about 1 wt % to about 2 wt %, for example, about 1.5 wt % to about 1.8 wt %, based on a total weight of the solid electrolyte.

The water content of the solid electrolyte may be determined using, for example, a thermogravimetric analysis method. In the thermogravimetric analysis, the water content of the solid electrolyte may be measured in air using a thermogravimetric analyzer, e.g., a TA instruments SDT-Q600, over the temperature range from 100° C. to 900° C. at a heating/cooling rate of 2° C. per minute, and determined from a weight loss before and after, e.g., at 100° C.

In one or more embodiments, the water content of the solid electrolyte may vary according to the water content of QX in a starting materials for forming the solid electrolyte including the compound of Formula 1 or Formula 3, i) a mixture of QX and $Ga_{1-z}(F_{1-k}Cl_k)_{3-3z}$, ii) a mixture of QX, $M_{z1}Z_{3z1}$, and $Ga_{1-z}(F_{1-k}Cl_k)_{3-3z}$, or iii) a mixture of QX and $Ga_{1-z}M_{z1}(F_{1-k}Cl_k)_{3-3z}Z_{3z1}$. Here, $0 \le z < 1$.

$$AQX\text{—}Ga_{1-z}M_{z1}(F_{1-k}Cl_k)_{3-3z}Z_{3z1} \qquad \text{Formula 1}$$

wherein, in Formula 1,
Q is Li or a combination of Li and Na, K, or a combination thereof,
M is a trivalent cation, or a combination thereof,
X is a halogen other than F, pseudohalogen, OH, or a combination thereof,
Z is a monovalent anion, or a combination thereof,
$1 < A < 5$, $0 \le z < 1$, $0 \le z1 \le 1$, and $0 \le k < 1$.

$$AQX\text{-}aM_{z1}Z_{3z1}\text{-}bGa_{1-z}(F_{1-k}Cl_k)_{3-3z} \qquad \text{Formula 3}$$

wherein, in Formula 3, Q is Li or a combination of Li and Na, K, or a combination thereof;
M is a trivalent cation, or a combination thereof,
X is a halogen other than F, pseudohalogen, OH, or a combination thereof,
Z is a monovalent anion, or a combination thereof,
$0 < a \le 1$, $0 < b \le 1$, $0 < a+b$, $a+b=4-A$, $1 < A < 5$, $0 \le z < 1$, $0 \le z1 \le 1$, and $0 \le k < 1$. In Formula 1 or 3, a and b are not both 1 at the same time, and $2 < A < 4$.

For example, QX may be LiCl.

The water content of QX may be about 5 wt % or less, about 0 wt %, about 0.5 wt % to about 5 wt %, about 1 wt % to about 4 wt %, for example, about 2 to about 3.5 wt %.

To obtain QX having a water content of about 5 wt % or less, heat treatment may further be performed at about 100° C. to about 190° C., about 130° C. to about 185° C., for example, about 140° C. to about 180° C. Through this heat treatment process, the water content in QX may be further reduced. The heat treatment time may be varied according to the heat treatment temperature, and may be, for example, within the range of about 1 to about 20 hours, about 2 to about 15 hours, or about 5 to about 13 hours.

In the solid electrolyte according to one or more embodiments, moisture may form a complex with the compound of Formula 1 constituting the solid electrolyte and thus have a hydrate form.

In the solid electrolyte according to one or more embodiments, moisture may be present in the form of being adsorbed on the surface of the solid electrolyte. In the solid electrolyte according to one or more embodiments, moisture may be adsorbed on the surface of the solid electrolyte and contained inside the solid electrolyte. In the solid electrolyte according to one or more embodiments, the water content may be highest on the surface of the solid electrolyte and may be gradually reduced towards the inside thereof.

In Formula 1, X may be Cl, Br, I, or a combination thereof, and Z may be Cl, Br, I, SCN, OCN, CN, OH, $N_3$, or a combination thereof.

In Formula 1, when Q is a combination of Li and Na, K, or a combination thereof, and a molar fraction of the Na and K may be about 0.1 to about 0.9, about 0.1 to about 0.6, for example, or about 0.1 to about 0.5. A total molar fraction of Li and Na and K may be 1.

In Formula 1, Q may be Li or a combination of Li and Na.

In Formula 1 and 3, $0 \le z < 0.5$, $0 \le z \le 0.5$, $0 \le z \le 0.4$, $0 \le z \le 0.3$, $0 \le z \le 0.2$, or $0 \le z \le 0.1$.

The compound of Formula 1 or 3 may be a compound represented by Formula 2.

$$ALiX\text{—}Ga_{1-z}M_{z1}(F_{1-k}Cl_k)_{3-3z}Z_{3z1} \qquad \text{Formula 2}$$

wherein, in Formula 1, M is a trivalent cation, or a combination thereof,
X is a halogen other than F, pseudohalogen, OH, or a combination thereof,
Z is a monovalent anion, or a combination thereof,
$1 < A < 5$, $0 \le z < 1$, $0 \le z1 \le 1$, and $0 \le k < 1$. In Formula 2, a and b are not both 1. In Formula 2, $1 < A \le 4$, $1 < A < 4$, $2 \le A \le 4$, or $2 < A < 4$.

In Formula 2, $0 \le z \le 0.5$, $0 \le z \le 0.4$, $0 \le z \le 0.3$, $0 \le z \le 0.2$, or $0 \le z \le 0.1$.

In one or more embodiments, the compound of Formula 1 or 3 may be a compound represented by Formula 4.

$$ALiX\text{-}aM_{z1}Z_{3z1}\text{-}bGa_{1-z}(F_{1-k}Cl_k)_{3-3z} \qquad \text{Formula 4}$$

wherein, in Formula 4, M is a trivalent cation, or a combination thereof,
X is a halogen other than F, pseudohalogen, OH, or a combination thereof,
Z is a monovalent anion, or a combination thereof,
$0 < a \le 1$, $0 < b \le 1$, $0 < a+b$, $a+b=4-A$, $1 < A < 4$, $0 \le z < 1$, $0 \le z1 \le 1$, and $0 \le k < 1$. In Formula 4, a and b are not both 1 at the same time.

In one or more embodiments, the solid electrolyte may have an ionic conductivity at room temperature (25° C.) of about 0.1 mS/cm or greater, about 0.3 mS/cm or greater, about 1 mS/cm or greater, about 2 mS/cm or greater, or about 3 mS/cm or greater.

In one or more embodiments, the solid electrolyte may have an ionic conductivity at room temperature (25° C.) of about 0.2 mS/cm to about 4 mS/cm, for example, about 3.2 mS/cm to about 3.4 mS/cm. Since the solid electrolyte has a high ionic conductivity, an electrochemical battery including the solid electrolyte may have further reduced internal resistance.

The solid electrolyte may have an activation energy at 25° C. of about 200 meV to about 500 meV.

For example, the compound of Formula 1 or 3 may be a compounds of Formulae 5 to 7, or a combination thereof.

$$ALiCl\text{—}GaF_3 \qquad \text{Formula 5}$$

In Formula 5, A may be 2, 3, or 4.

$$ALiBr\text{—}GaF_3 \qquad \text{Formula 6}$$

In Formula 6, A may be 2, 3, or 4.

$$ALiCl\text{-}aM_{z1}Z_{3z1}\text{-}bGaF_3 \qquad \text{Formula 7}$$

In Formula 7, A may be 2 or 3,
Z may be Cl or OH,
M may be La, In, In, Sc, Al, Tl, Y, B, La, or a combination thereof,
$0 < a < 1$, $0 < b < 1$, $0 < a+b$, $a+b=4-A$, and $0 \le z1 \le 1$.
In Formula 7, $0.1 \le a \le 0.5$, and $0.1 \le b \le 1$.

For example, the compound of Formula 1 or 3 may be $2LiCl\text{—}GaF_3$, $3LiCl\text{—}GaF_3$, $4LiCl\text{—}GaF_3$, $3LiBr\text{—}GaF_3$, $2LiCl\text{—}LiOH\text{—}GaF_3$, $3LiCl\text{-}0.1LaCl_3\text{-}0.9GaF_3$, $3LiCl\text{-}0.1InCl_3\text{-}0.9GaF_3$, $3LiCl\text{-}0.1ScCl_3\text{-}0.9GaF_3$, $3LiCl\text{-}0.1AlCl_3\text{-}0.9GaF_3$, $3LiCl\text{-}0.1TlCl_3\text{-}0.9GaF_3$, $3LiCl\text{-}0.1YCl_3\text{-}0.9GaF_3$, $3LiCl\text{-}0.1BCl_3\text{-}0.9GaF_3$, $2LiBr\text{—}GaF_3$, 4LiBr—GaF$_3$, 2LiClO$_4$—GaF$_3$, 2LiClO$_4$—LiOH—GaF$_3$, 3LiCl—NaCl—GaF$_3$, 3LiCl-0.2LaCl$_3$-0.8GaF$_3$, 3LiCl-0.2InCl$_3$-0.8GaF$_3$, 3LiCl-0.3LaCl$_3$-0.7GaF$_3$, 3LiCl-0.3InCl$_3$-0.7GaF$_3$, 3LiCl-0.5LaCl$_3$-0.5GaF$_3$, 3LiCl-0.5InCl$_3$-0.5GaF$_3$, 3LiCl-0.2ScCl$_3$-0.8GaF$_3$, 3LiCl-0.3ScCl$_3$-0.7GaF$_3$, 3LiCl-0.5ScCl$_3$-0.5GaF$_3$, 3LiCl-0.2AlCl$_3$-0.8GaF$_3$, 3LiCl-0.3AlCl$_3$-0.7GaF$_3$, 3LiCl-0.5AlCl$_3$-0.5GaF$_3$, 3LiCl-0.2BCl$_3$-0.8GaF$_3$, 3LiCl-0.3BCl$_3$-0.7GaF$_3$, 3LiCl-0.5BCl$_3$-0.5GaF$_3$, 3LiCl-0.2TlCl$_3$-0.8GaF$_3$, 3LiCl-0.3TlCl$_3$-0.7GaF$_3$, 3LiCl-0.5TlCl$_3$-0.5GaF$_3$, 3LiCl-0.2YCl$_3$-0.8GaF$_3$, 3LiCl-0.3YCl$_3$-0.7GaF$_3$, 3LiCl-0.5YCl$_3$-0.5GaF$_3$, 2LiCl—GaF$_2$Cl, 4LiCl—GaF$_2$Cl, 3LiBr—GaF$_2$Cl, 2LiCl—LiOH—GaF$_2$Cl, 2LiCl-1NaCl—GaF$_3$, 2LiCl-1KCl—GaF$_3$, 3LiCl—GaF$_2$Cl, 2LiCl-0.1AlCl$_3$-0.9GaF$_3$, 2LiCl-0.1ScCl$_3$-0.9GaF$_3$, 2LiCl-0.1BCl$_3$-0.9GaF$_3$, 2LiCl-0.1YCl$_3$-0.9GaF$_3$, 4LiCl-0.1AlCl$_3$-0.9GaF$_3$, 4LiCl-0.1ScCl$_3$-0.9GaF$_3$, 4LiCl-0.1BCl$_3$-0.9GaF$_3$, 4LiCl-0.1YCl$_3$-0.9GaF$_3$, or a combination thereof.

A Cl 2p peak, obtained by X-ray photoelectron spectroscopy (XPS) analysis of the compound of Formula 1 or 3, may appear at a binding energy of about 199 eV to about 203 eV. The Cl 2p peak, a peak associated with Ga—X, such as a Ga—Cl bond, may be shifted towards a higher binding energy than a Cl 2p peak for a simple blend of LiX and GaF$_3$.

In one or more embodiments, the compound of Formula 1 or 3, when analyzed by XRD with Cu Kα radiation, may exhibit a main peak at a diffraction angle (2θ) of 25° to 35°, and a minor peak at diffraction angles (2θ) of 48° to 65°. The term "main peak" as used herein refers to a peak having the maximum intensity, and main and minor peaks are associated with crystalline characteristics like LiCl, and minor peaks have smaller intensity than the main peak.

In one or more embodiments, the compound of Formula 1 or 3, as obtained by XRD with Cu Kα radiation, may exhibit peaks at diffraction angles (2θ) of 29° to 31°, 33° to 35°, and 49° to 51°.

In one or more embodiments, the compound of Formula 1 or 3, as obtained by XRD with Cu Kα radiation, may exhibit peaks in a region of diffraction angles (2θ) of 29° to 31°, a region of diffraction angles (2θ) of 33° to 35°, a region of diffraction angles (2θ) of 59° to 61°, and a region of diffraction angles (2θ) of 62° to 64°.

Rheological characteristics of the solid electrolyte according to one or more embodiments will now be described.

The solid electrolyte may have a loss modulus of about 100 Pa or greater, about 1,000 Pa or greater, about 10,000 Pa or greater, about 100,000 Pa or greater, for example, about 100,000 Pa to about 1,000,000 Pa, and the solid electrolyte may have a loss modulus of about 100 MPa or less, about 50 MPa or less, or about 30 MPa or less, where the upper and lower bounds are independently combinable. In one or more embodiments, the solid electrolyte may have a loss modulus of about 1 MPa to about 50 MPa, or about 1 MPa to about 30 MPa.

The loss modulus (G") and the storage modulus (G') may be measured according to ASTM D4065, D4440, or D5279, and may be evaluated by measurement of the viscosity of the solid electrolyte using a rheometer while varying a shear rate. In more detail, the viscosity of the solid electrolyte may be measured using a cone and plate rheometer, e.g., a TA Instruments AR 2000 analyzer.

After a solid electrolyte (sample) having a thickness of about 1 millimeter (mm) is disposed between a cone having a cone angle of 2° and a plate having a diameter of 40 mm, the interval between the cone and the plate is adjusted, and then a stress is applied to the sample while the shear rate is varied, to perform a rheological evaluation.

The solid electrolyte may have flexible properties and be made into a thin film having a thickness of 100 micrometers (μm) or less. The solid electrolyte may have a thickness of, for example, about 1 μm to about 100 μm, for example, about 1 μm to about 50 μm. Since the solid electrolyte has flexible properties, manufacture of a flexible solid secondary battery using the solid electrolyte may be facilitated.

The composition of the solid electrolyte may be determined through inductively coupled plasma (ICP) spectrometry.

In one or more embodiments, when the solid electrolyte has a water content of about 10 wt % to about 30 wt %, based on a total weight of the solid electrolyte, the solid electrolyte may have an ionic conductivity of 10 mS/cm or greater at 25° C. The solid electrolyte may exhibit characteristics in which ionic conductivity rapidly increases when moisture is absorbed. As such, due to excellent sensitivity to moisture, the solid electrolyte may be used as an electrochemical-based sensor like a moisture sensor.

The temperature at which viscosity characteristics of the solid electrolyte are maintained may be about −60° C. to about 160° C.

When the compound of Formula 1 or 3 has a glass-ceramic structure, the amount of the ceramic may be about 0.1 wt % to 30 wt %, based on a total weight of the solid electrolyte. The amount of the ceramic may be varied according to the amount of QX, for example, LiCl, among the starting materials for forming the solid electrolyte including the compound of Formula 1.

The compound of Formula 1 may be electrochemically stable at a voltage of about 2.0V to about 4.6V, for example, about 2.4V to about 4.1V, with respect to lithium metal. The compound of Formula 1 may be present in the form of particles. The particles may have an average particle diameter of about 5 nm to about 500 μm, for example, about 100 nm to about 100 μm, for example, about 1 μm to about 50 μm, and have a specific surface area of about 0.01 m$^2$/g to about 1000 m$^2$/g, for example, about 0.5 m$^2$/g to about 100 m$^2$/g.

A method of preparing the solid electrolyte according to one or more embodiments will be described.

First, i) a mixture of QX and Ga$_{1-z}$(F$_{1-k}$Cl$_k$)$_{3-3z}$, ii) a mixture of QX, M$_{z1}$Z$_{3z1}$, and Ga$_{1-z}$(F$_{1-k}$Cl$_k$)$_{3-3z}$, or iii) a mixture of QX and Ga$_{1-z}$M$_{z1}$(F$_{1-k}$Cl$_k$)$_{3-3z}$Z$_{3z1}$ may be provided. A solid electrolyte may be obtained by subjecting the mixture to mechanical milling.

The amount of each component in the mixture may be stoichiometrically controlled so as to obtain the compound represented by Formula 1. In the mixtures, i.e., i) a mixture of QX and Ga$_{1-z}$(F$_{1-k}$Cl$_k$)$_{3-3z}$, ii) a mixture of QX, M$_{z1}$Z$_{3z1}$, and Ga$_{1-z}$(F$_{1-k}$Cl$_k$)$_{3-3z}$, or iii) a mixture of QX and Ga$_{1-z}$M$_{z1}$(F$_{1-k}$Cl$_k$)$_{3-3z}$Z$_{3z1}$, wherein Q, X, M, Z, and z are defined the same as Q, X, M, Z, and z in Formula 1 or 3.

Mechanical milling applies the principle of generating surface energy from mechanical energy to coat interfaces having high surface energies by adhesion and/or fusion.

Mechanical milling may be implemented via mechanical friction of the components in a mixture, and for example, a compression stress may be applied mechanically via rotation at a rotation speed of about 100 rpm to about 3,000 rpm, about 300 rpm to about 1,000 rpm, or about 500 rpm to about 800 rpm.

Mechanical milling may be performed, for example, using a method of ball milling, air jet milling, bead milling, roll milling, planetary milling, hand milling, high-energy ball milling, stirring ball milling, vibrating milling, mechanofusion milling, shaker milling, attritor milling, disk milling, shape milling, NAUTA milling, NOBILTA milling, high-speed mixing, or a combination thereof, but is not limited thereto. Mechanical milling may be performed using, for example, ball milling, airjet milling, bead milling, roll milling, planetary milling, hand milling, or the like.

Mechanical milling may be performed, for example, under an inert gas atmosphere. The inert gas atmosphere may be created using an inert gas such as nitrogen, argon, helium, or the like.

The solid electrolyte preparation method may further include, after mechanical milling, a step of leaving to standing. Through the step of leaving to stand, the temperature of the product from the mechanical milling may be cooled down. Through the step of leaving to stand, for example, the temperature of the product from the mechanical milling may be controlled to be 80° C. or lower, for example, about 20° C. to 80° C.

A separate heat treatment process can be omitted for the solid electrolyte according to one or more embodiments, unlike other methods of preparing a solid electrolyte. After the mechanical milling of the mixture for forming the solid electrolyte according to one or more embodiments, a separate heat treatment is not performed. If a thermal treatment process is further performed, it may be difficult to obtain the solid electrolyte according to one or more embodiments.

Through the mechanical milling of the mixture as described above, it may be possible to control the particle size of the product obtained from the mechanical milling. The particle size of the product obtained through the mechanical milling may be controlled to be about 1 μm or less, about 0.01 μm to about 0.9 μm, about 0.01 μm to about 0.7 μm, for example, about 0.01 to about 0.5 μm. When the particle size is controlled as above, the final solid electrolyte may have improved density. The term "particle size" as used herein may represent the diameter of particles when the particles are spherical, or the length of the major axis when the particles are non-spherical.

The mechanical milling may be, for example, high-energy milling. High-energy milling may be performed with, for example, Pulverisette 7 Premium line equipment at about 300 rpm to about 1000 rpm, or about 400 rpm to about 900 rpm. Through such high-energy milling, the sizes of the components of the mixture may become fine and reaction there between occur more easily, and thus the solid electrolyte may be prepared within a shorter time.

After the step of leaving to stand is performed once, the mechanical milling step and the leaving to stand step may be repeatedly performed. One cycle of the steps of mechanical milling and leaving to stand may be repeatedly performed, for example, 50 to 100 cycles in total.

Although the mechanical milling time and the leaving to stand time may be variable, for example, the leaving to stand time may be controlled to be shorter than the mechanical milling time. The mechanical milling time may be, for example, about 5 minutes to about 20 hours, for example, about 5 hours to about 15 hours, and the standing time may be, for example, about 1 minute to about 15 minutes, about 2 minutes to about 10 minutes, or about 5 minutes.

In the method according to one or more embodiments, QX may be LiX, or a mixture of LiX and NaX, KX, or a combination thereof. LiX may be LiCl, LiBr, LiOH, LiClO$_4$, or a combination thereof.

The at least NaX, KX or a combination thereof may be NaCl, NaBr, KCl, KBr, or a combination thereof.

In the method according to one or more embodiments, $M_{z1}Z_{3z1}$ may be LaCl$_3$, InCl$_3$, AlCl$_3$, YCl$_3$, TlCl$_3$, ScCl$_3$, BCl$_3$, or a combination thereof; $Ga_{1-z}(F_{1-k}Cl_k)_{3-3z}$ may be GaF$_3$; and $Ga_{1-z}M_{z1}(F_{1-k}Cl_k)_{3-3z}Z_{3z}$ may be LaCl$_3$GaF$_3$, InCl$_3$GaF$_3$, AlCl$_3$GaF$_3$, YCl$_3$GaF$_3$, TlCl$_3$GaF$_3$, ScCl$_3$GaF$_3$, BCl$_3$GaF$_3$, or a combination thereof.

According to another aspect, there is provided an electrochemical device including the solid electrolyte according to one or more embodiments.

The electrochemical device may be, for example, an electrochemical battery, an accumulator, a supercapacitor, a fuel cell, a sensor, or an electrochromic device. The sensor may be, for example, a moisture sensor.

According to another aspect, there is provided an electrochemical battery including the solid electrolyte according to one or more embodiments.

The electrochemical device may be a secondary battery including a cathode, an anode, and the solid electrolyte according to one or more embodiments interposed between the cathode and the anode.

The secondary battery may be a solid-electrolyte-containing secondary battery including: a cathode; an anode including lithium; and the solid electrolyte according to one or more embodiments interposed between the cathode and the anode. The secondary battery may be, for example, a lithium secondary battery, a lithium air battery, or a solid secondary battery. For example, the secondary battery may be a solid secondary battery.

The electrochemical battery may be used to provide a primary battery or a secondary battery. The shape of the electrochemical battery is not specifically limited and may be, for example, a coin, a button, a sheet, a stack, a cylinder, a plane, or a horn. The electrochemical battery according to one or more embodiments may be used in a medium- or large-sized battery for electric vehicles.

The electrochemical battery may be, for example, a solid secondary battery using a precipitation-type anode. The precipitation-type anode indicates an anode which has, at the time of assembly of an electrochemical battery, an coating layer including no anode active material, and the anode active material is formed through the precipitation of the anode active material, such as lithium metal, after charging of the electrochemical battery.

The solid electrolyte according to one or more embodiments may be a cathode electrolyte (catholyte), an electrolyte protective film, a cathode protective film, an anode protective film, or a combination thereof. A protected cathode comprises a cathode and layer comprising the solid electrolyte, i.e., a cathode protective film, thereon. A protected anode comprises an anode and a layer comprising the solid electrolyte, i.e., an anode protective film, thereon.

The solid electrolyte according to one or more embodiments may have a high oxidation stability potential of about 3.5 V or greater vs. Li/Li$^+$, for example, 4.6 V to 5.0 V or greater vs. Li/Li$^+$, and thus may be applicable as a catholyte, for example, a catholyte for an all-solid secondary lithium batteries.

The solid electrolyte according to one or more embodiments may replace an ionic liquid-containing electrolyte of a solid secondary battery using an existing oxide solid electrolyte.

The solid electrolyte according to one or more embodiments may be prepared using the compound of Formula 1 or 3, and a sintering process may be avoided. The solid electrolyte according to one or more embodiments is flexible and has good formability, and thus may have a freeform. For example, the solid electrolyte according to one or more embodiments may be formed as an electrolyte having a thickness of about 100 μm or less through a roll-to-roll process.

The electrochemical battery may be a solid secondary battery. The solid secondary battery according to one or more embodiments may further include an oxide solid electrolyte which is stable in air.

The solid secondary battery may have a cathode/solid electrolyte/oxide solid electrolyte/lithium anode structure, where the solid secondary battery has layers as indicated and in the stated order.

The solid secondary battery may further include an ionic liquid-containing electrolyte and an oxide solid electrolyte to provide a cathode/ionic liquid-containing electrolyte/oxide solid electrolyte/solid electrolyte/oxide solid electrolyte/lithium anode structure, where the solid secondary battery has layers as indicated and in the stated order.

The lithium anode may be a lithium metal electrode or a lithium alloy electrode. When employing such a lithium anode, the solid secondary battery may have a high energy density per volume.

The oxide solid electrolyte may include a Garnet-based ceramic ($Li_{3+x}La_3M_2O_{12}$) (wherein M may be Te, Nb, or Zr, and x may be an integer of 1 to 10), lithium phosphorus oxynitride ($Li_xPO_yN_z$, wherein $0<x<1$, $0<y<1$, and $0<z<1$) (LiPON), $Li_xP_yO_zN_K$ (wherein $2.7\leq z\leq 3.3$, $0.8\leq y\leq 1.2$, $3.5\leq z\leq 3.9$, and $0.1\leq k\leq 0.5$), $Li_wPO_xN_yS_z$ (wherein $0<w<1$, $0<x<1$, $0<y<1$, and $0<z<1$), $Li_{1+x+y}Al_xTi_{2-x}Si_yP_{3-y}O_{12}$ (wherein $0<x<2$ and $0\leq y<3$), $BaTiO_3$, $Pb(Zr_xTi_{1-x})O_3$ wherein $0\leq x\leq 1$, $Pb_{1-x}La_xZr_{1-y}Ti_yO_3$ (PLZT) (wherein $0\leq x<1$ and $0\leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$) (wherein $0<x<2$ and $0<y<3$), lithium aluminum titanium phosphate ($Li_xAl_yTi_z(PO_4)_3$) (wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (wherein $0\leq x\leq 1$, $0\leq y\leq 10\leq a\leq 1$ and $0\leq b\leq 1$), lithium lanthanum titanate ($Li_xLa_yTiO_3$, wherein $0<x<2$ and $0<y<3$), lithium germanium thio phosphate ($Li_xGe_yP_zS_w$) (wherein $0<x<4$, $0<y<1$, $0<z<1$, and $0<w<5$), lithium nitride-based glass ($Li_xN_y$, wherein $0<x<4$ and $0<y<2$), $SiS_2$ based glass ($Li_xSi_yS_z$, wherein $0<x<3$, $0<y<2$, and $0<z<4$), $P_2S_5$-based glass ($Li_xP_yS_z$, wherein $0<x<3$, $0<y<3$, and $0<z<7$), $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$-based ceramic, or a combination thereof.

As the oxide solid electrolyte, for example, a Garnet-based oxide solid electrolyte having good reduction stability when in contact with a lithium anode may be used. For example, as the oxide solid electrolyte a Garnet-based ceramic (e.g., $Li_{3+x}La_3M_2O_{12}$) (wherein M may be Te, Nb, or Zr, and x may be an integer of 1 to 10), for example, LLZO (e.g., $Li_{6.5}La_3Zn_{1.5}Ta_{0.5}O_{12}$), may be used.

The solid electrolyte according to one or more embodiments may be used as a cathode protective film in a solid secondary battery using an oxide solid electrolyte which is stable in air, to effectively reduce reaction between the solid electrolyte and the cathode. The solid electrolyte according to one or more embodiments may be used as a cathode coating material to form a cathode protective film.

Figure 11A:
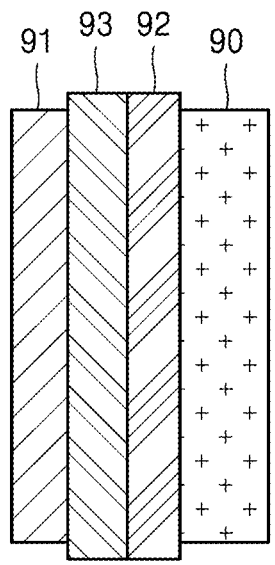
FIG. 11A is a schematic cross-sectional view illustrating an embodiment of a structure of a solid secondary battery.

FIG. 11A is a schematic cross-sectional view illustrating a structure of a solid secondary battery according to an embodiment.

Referring to FIG. 11A, a first oxide solid electrolyte 93 and a solid electrolyte 92 according to an embodiment may be sequentially arranged on an anode 91, and a cathode 90 is arranged adjacent to the solid electrolyte 92. Thus, the solid electrolyte 92 is disposed between the first oxide solid electrolyte 93 and the cathode 90, and the solid electrolyte 92 and the cathode 90 may uniformly contact each other without an ionic liquid-containing electrolyte. The solid electrolyte 92 may have good compatibility with the first oxide solid electrolyte 93, and thus be used as a catholyte instead of an ionic liquid-containing electrolyte. The ionic liquid-containing electrolyte may be, for example, a liquid electrolyte containing an ionic liquid.

The ionic liquid may comprise, for example, N-methyl-N-propylpyrrolidinium bis(trifluoromethanesulfonyl)imide, N-butyl-N-methylpyrrolidium bis(3-trifluoromethylsulfonyl)imide, 1-butyl-3-methylimidazolium bis(trifluoromethylsulfonyl)imide, 1-ethyl-3-methylimidazolium bis(trifluoromethylsulfonyl)imide, or a combination thereof.

Figure 11B:
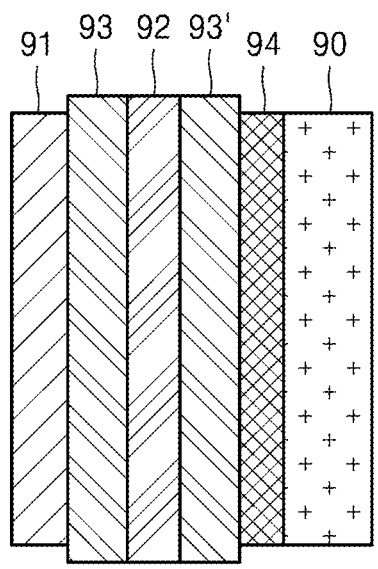
FIG. 11B is a schematic cross-sectional view illustrating an embodiment of a structure of a solid secondary battery.

FIG. 11B illustrates a structure of a solid secondary battery according to an embodiment.

Referring to FIG. 11B, an ionic liquid-containing electrolyte 94 may be arranged on a cathode 90, and a second oxide solid electrolyte 93', a solid electrolyte 92 according to an embodiment, and a first oxide solid electrolyte 93 may be sequentially arranged on the ionic liquid-containing electrolyte 94. An anode 91 may be arranged adjacent to the first oxide solid electrolyte 93. The anode 91 may be a lithium anode.

Due to the presence of the solid electrolyte 92 according to an embodiment, use of a high pressure for complete solidification may be avoided, and the cathode and the solid electrolyte may have improved uniformity at a contact interface therebetween.

A structure of a solid secondary battery 1 according to another embodiment will be described with reference to FIG. 17.

Figure 17:
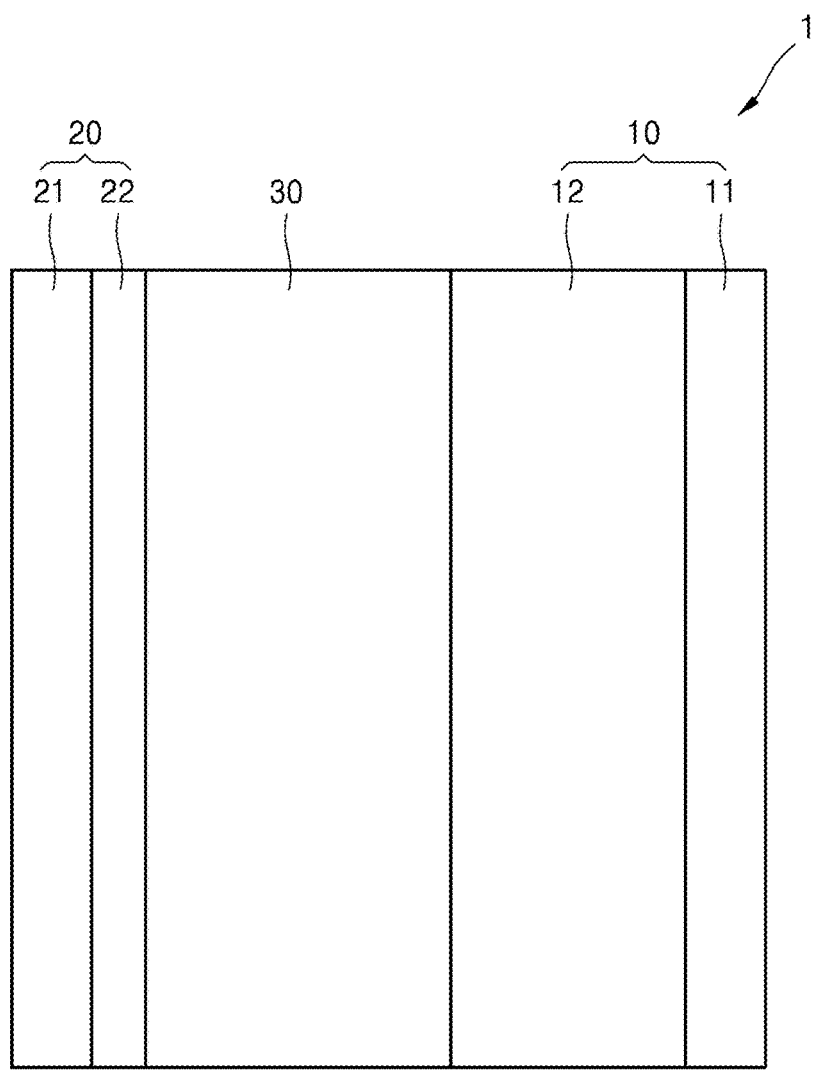
FIGS. 17 to 19 are each a schematic cross-sectional view illustrating an embodiment of a structure of a solid secondary battery.

As shown in FIG. 17, the solid secondary battery 1 according to an embodiment may include a cathode 10, an anode 20, and a solid electrolyte 30 according to an embodiment.

The cathode 10 may include a cathode current collector 11 and a cathode active material layer 12.

For use as the cathode current collector 11, for example, a plate structure or a foil structure, each made of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof, may be used. The cathode current collector 11 may be omitted.

The cathode active material layer 12 may include a cathode active material and a solid electrolyte. The solid electrolyte included in the cathode 10 may be similar to or different from the solid electrolyte 30.

The cathode active material may be any cathode active material capable of reversible intercalation and deintercalation of lithium ions. For example, the cathode active material may be prepared using lithium cobalt oxide (LCO), lithium nickel oxide, lithium nickel cobalt oxide, lithium nickel cobalt aluminum oxide (NCA), lithium nickel cobalt manganese oxide (NCM), lithium manganate, lithium iron phosphate, nickel sulfide, copper sulfide, lithium sulfide, iron oxide, or vanadium oxide. These cathode active materials may be used alone or in combination of two or more.

The cathode active material may be, for example, a lithium transition metal oxide such as $LiNi_xCo_yAl_zO_2$ (NCA) or $LiNi_xCo_yMn_zO_2$ (NCM) (wherein $0<x<1$, $0<y<1$, $0<z<1$, and $x+y+z=1$).

The cathode active material may be covered with a coating layer. In one or more embodiments, the coating layer may be any suitable coating layer of cathode active material for solid secondary batteries. An example of the coating layer may include, for example, $Li_2O$—$ZrO_2$.

When the cathode active material is formed of a lithium transition metal oxide such as NCA or NCM, and includes nickel (Ni), the capacity density of the solid secondary battery 1 may be increased, and the elution of metal from the cathode active material in a charged state may be reduced. Accordingly, long-term reliability and cycle characteristics of the solid secondary battery 1 according to an embodiment may be improved.

The cathode active material may be in the form of particles, for example, elliptical or spherical particles. The cathode active material may have a particle diameter, not specifically limited, within a range applied to cathode active materials of a solid secondary battery. In addition, the amount of the cathode active material of the cathode 10 is not specifically limited, and may be within a range applied to the cathode of a solid secondary battery. The particle size, shape, and amount of the cathode active material can be determined without undue experimentation.

In addition, the cathode 10 may include the cathode active material as described above and a solid electrolyte, and further additives, for example, a conducting agent, a binder, a filler, a dispersant, or an ion-conductive auxiliary agent, which may be appropriately mixed.

Examples of the conductive agent which can be mixed into the cathode 10 include graphite, carbon black, acetylene black, Ketjen black, carbon fiber, and metal powder. Examples of the binder which can be mixed into the cathode 10 include styrene butadiene rubber (SBR), polytetrafluoroethylene, polyvinylidenefluoride, and polyethylene. The coating agent, the dispersant, and the ion-conductive auxiliary agent which can be mixed into the cathode 10 may be any suitable materials used for an electrode of a solid secondary battery.

The anode 20 may include an anode current collector 21 and a first anode active material layer 22.

An anode active material included in the first anode active material layer 22 may be, for example, in the form of particles. The anode active material in the form of particles may have an average particle diameter of, for example, about 4 um or less, 3 um or less, about 2 um or less, about 1 um or less, or about 900 nm or less. The anode active material in the form of particles may have an average particle diameter of, for example, about 10 nm to about 4 um or less, about 10 nm to about 3 um or less, about 10 nm to about 2 um or less, about 10 nm to about 1 um or less, or about 10 nm to about 900 nm or less. As the anode active material has an average particle diameter within these ranges, this may further facilitate reversible absorption and/or desorption of lithium during charging and discharging. The average particle diameter of the anode active material is, for example, a median diameter (D50) measured using a laser particle size distribution analyzer.

The anode active material included in the first anode active material layer 22 may include, for example, a carbonaceous anode active material, a metal, or a metalloid anode active material, or combination thereof.

In particular, the carbonaceous anode active material may be amorphous carbon. The amorphous carbon may be, for example, carbon black (CB), acetylene black (AB), furnace black (FB), ketjen black (KB), graphene, or the like, but is not limited thereto. The amorphous carbon may be any suitable amorphous carbon material. The amorphous carbon may be a carbon having no or very low crystallinity and is distinguished from crystalline carbon or graphitic carbon.

The metal or metalloid anode active material includes gold (Au), platinum (Pt), palladium (Pd), silicon (Si), silver (Ag), aluminum (Al), bismuth (Bi), tin (Sn), zinc (Zn), or a combination thereof, but is not limited thereto. The metal or metalloid anode active material may be any suitable material used as a metal anode active material or metalloid anode active material that forms an alloy or compound with lithium in the art. For example, since nickel (Ni) does not form an alloy with lithium, nickel is not a metal anode active material.

The first anode active material layer 22 includes a single kind of anode active material or a mixture of a plurality of different anode active materials selected from these anode active materials. For example, the first anode active material layer 22 includes amorphous carbon alone, or gold (Au), platinum (Pt), palladium (Pd), silicon (Si), silver (Ag), aluminum (Al), bismuth (Bi), tin (Sn), zinc (Zn), or a combination thereof. In another example, the first anode active material layer 22 includes a mixture of amorphous carbon with gold (Au), platinum (Pt), palladium (Pd), silicon (Si), silver (Ag), aluminum (Al), bismuth (Bi), tin (Sn), zinc (Zn), or a combination thereof. A mixing ratio in a mixture of amorphous carbon and, for example, gold, may be, by weight, for example, 10:1 to 1:2, 5:1 to 1:1, or 4:1 to 2:1, but is not limited thereto. The mixing ratio may be any suitable ratio selected according to desired characteristics of the solid secondary battery 1. As the anode active material has such a composition, the solid secondary battery 1 has further improved cycle characteristics.

The anode active material included in the first anode active material layer 22 includes, for example, a mixture of amorphous carbon first particles and metal or metalloid second particles. The metal or metalloid includes, for example, gold (Au), platinum (Pt), palladium (Pd), silicon (Si), silver (Ag), aluminum (Al), bismuth (Bi), tin (Sn), zinc (Zn), or the like. In other embodiments, the metalloid is a semiconductor. The amount of the second particles is about 8 wt % to about 60 wt %, about 10 wt % to about 50 wt %, about 15 wt % to about 40 wt %, or about 20 wt % to 30 wt %, with respect to the total weight of the mixture. As the amount of the second particles is within these ranges, for example, the solid secondary battery 1 has further improved cycle characteristics.

The first anode active material layer 22 includes, for example, a binder. The binder may be, for example, styrene butadiene rubber (SBR), polytetrafluoroethylene (PTEE), polyvinylidene fluoride (PVDF), polyethylene, a vinylidene fluoride/hexafluoropropylene copolymer, polyacrylonitrile, polymethyl methacrylate, or the like, but is not necessarily limited thereto. The binder may be any suitable material that is used as a binder in the art. The binder may consist of one binder alone or a plurality of different binders.

By the inclusion of a binder in the first anode active material layer 22, the first anode active material layer 22 is stabilized on the anode current collector 21. In addition, despite a change in volume and/or relative position of the first anode active material layer 22 during charging and discharging, cracking of the first anode active material layer 22 is suppressed. For example, in a case where the first anode active material layer 22 does not include a binder, the first anode active material layer 22 may be easily delaminated from the anode current collector 21. A portion of the anode current collector 21 from which the first anode active material layer 22 is delaminated is exposed and contacts the solid electrolyte 30, and thus, a short circuit is highly likely to occur. The first anode active material layer 22 is formed by, for example, coating, on the anode current collector 21, a slurry in which materials constituting the first anode active material layer 22 are dispersed, and drying the slurry. By the inclusion of a binder in the first anode active material layer 22, the anode active material may be stably dispersed in the slurry. For example, when the slurry is coated on the anode current collector 21 using a screen printing method, clogging of the screen (for example, clogging by aggregates of the anode active material) may be inhibited.

The thickness of the first anode active material layer 22 may be, for example, about 50% or less, about 40% or less, about 30% or less, about 20% or less, about 10% or less, or about 5% or less of the thickness of a cathode active material layer. The thickness of the first anode active material layer may be, for example, about 1 um to about 20 um, about 2 um to about 10 um, or about 3 um to about 7 um. When the thickness (d22) of the first anode active material layer is too small, lithium dendrite formed between the first anode active material layer 22 and the anode current collector 21 collapses the first anode active material layer 22, and thus, it is difficult to improve the cyclic characteristics of the solid secondary battery 1. When the thickness of the first anode active material layer 22 is excessively increased, the energy density of the solid secondary battery 1 is reduced, and the internal resistance of the solid secondary battery 1 caused by the first anode active material layer 22 is increased, and thus, it is difficult to improve the cyclic characteristics of the solid secondary battery 1.

For example, the anode current collector 21 may comprise a material that does not react with lithium, that is, material that forms neither an alloy nor compound with lithium. Materials constituting the anode current collector 21 are, for example, copper (Cu), stainless steel, titanium (Ti), iron (Fe), cobalt (Co), nickel (Ni), and the like, but are not limited thereto. Any suitable materials used for anode current collectors in the art may be used. The anode current collector 21 may consist of one of the above-listed metals, or may consist of an alloy or coating material of two or more metals thereof. The anode current collector 21 may be, for example, in the form of a plate or foil.

The first anode active material layer 22 may further include an additive used in existing solid secondary batteries, for example, a filler, a dispersant, an ion-conductive agent, or the like.

Figure 18:
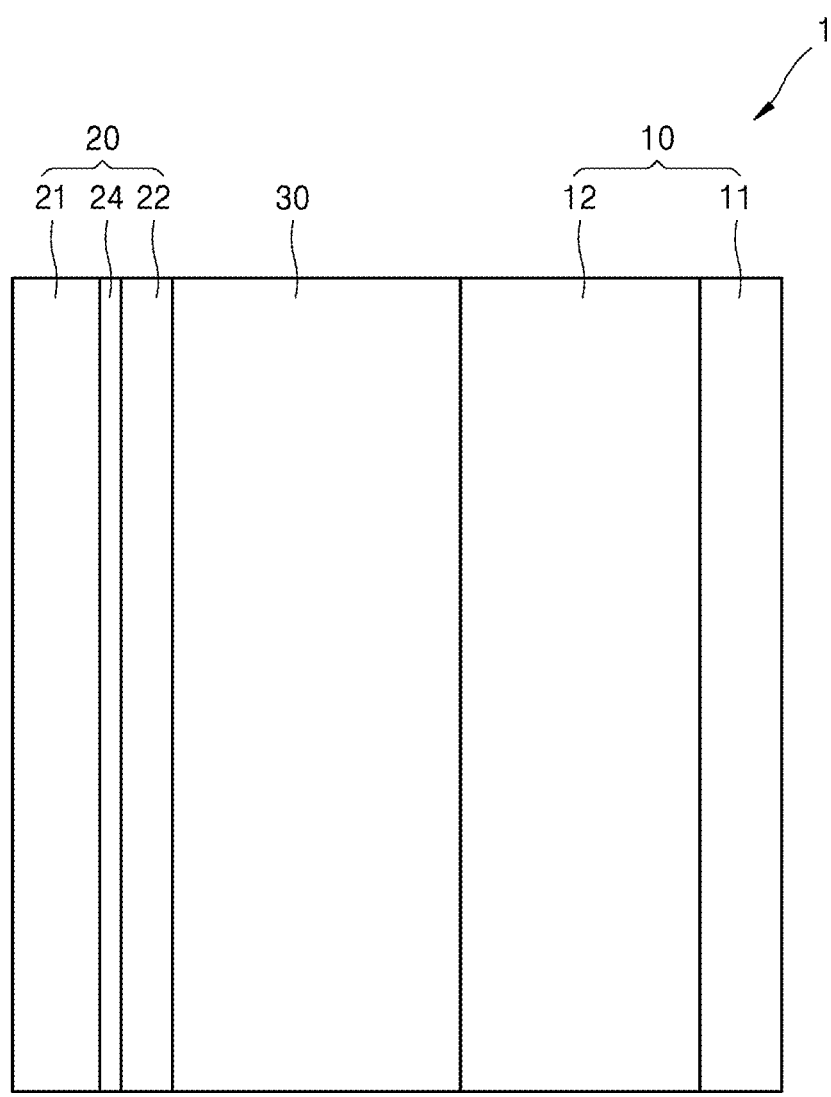

Referring to FIG. 18, for example, the solid secondary battery 1 further includes, on the anode current collector 21, a thin film 24 including an element capable of forming an alloy with lithium. The thin film 24 may be placed between the anode current collector 21 and the first anode active material layer 22. The thin film 24 includes, for example, an element capable of forming an alloy with lithium. The element capable of forming an alloy with lithium is, for example, gold, silver, zinc, tin, indium, silicon, aluminum, bismuth, or the like, but is not limited thereto, and may be any suitable element known in the art, capable of forming an alloy with lithium. The thin film 24 consists of one of these metals, or an alloy of these different metals. As the thin film 24 is placed on the anode current collector 21, for example, a second anode active material layer (not shown) deposited between the thin film 24 and the first anode active material layer 22 may have a more planarized form, and the solid secondary battery 1 may have further improved cyclic characteristics.

The thin film 24 may have a thickness of, for example, about 1 nm to about 800 nm, about 10 nm to about 700 nm, about 50 nm to about 600 nm, or about 100 nm to about 500 nm. When the thickness of the thin film 24 is less than 1 nm, it may be difficult that the function of the thin film 24 is exerted. When the thickness of the thin film 24 is too large, the thin film 24 itself absorb lithium so that the amount of deposition of lithium on the anode is reduced, thus lowering the energy density and cycle characteristics of the solid secondary battery 1. The thin film 24 may be disposed on the anode current collector 21, for example, by a vacuum deposition method, a sputtering method, a plating method, or the like. However, embodiments are not necessarily limited to these methods, and any method capable of forming the thin film 24 in the art may be used.

Figure 19:
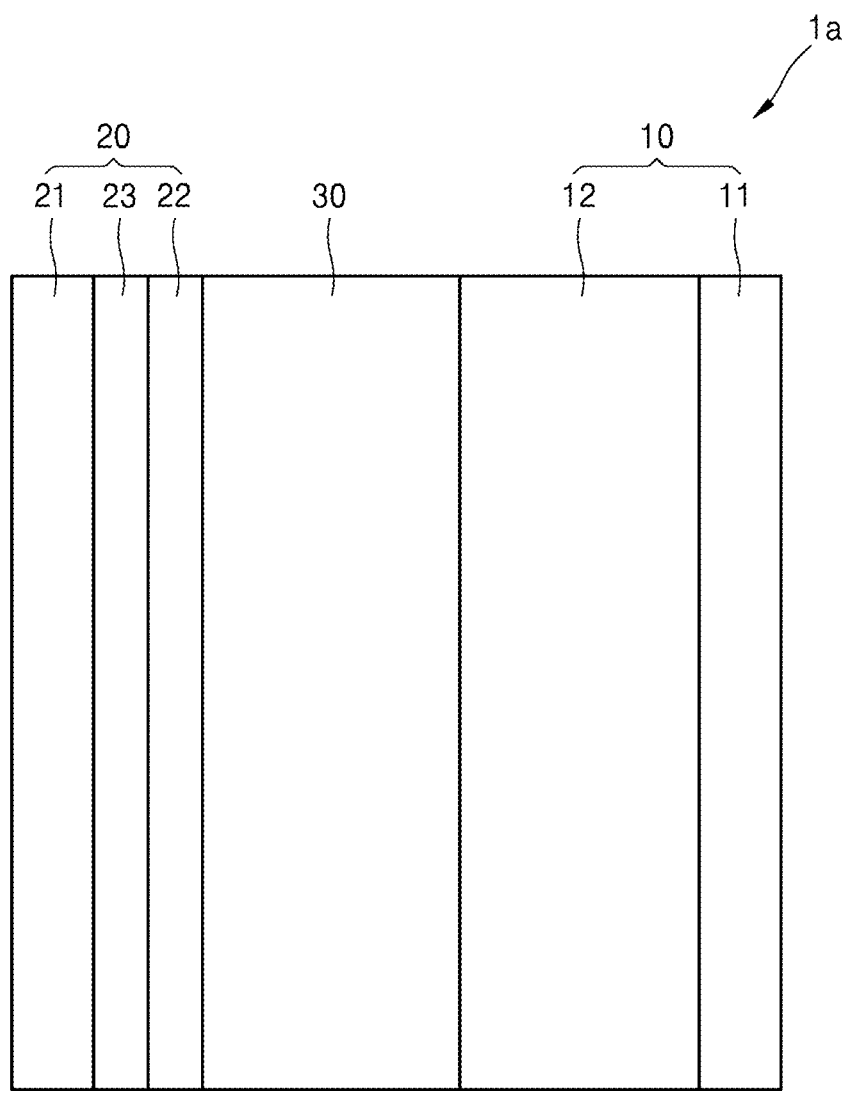

Referring to FIG. 19, the solid secondary battery 1 further includes a second anode active material layer 23 that is formed, for example, between the anode current collector 21 and the solid electrolyte 30, by charging. For example, the solid secondary battery 1 further includes the second anode active material layer 23 that is formed, for example, between the anode current collector 21 and the first anode active material layer 22, by charging. Although not illustrated, the solid secondary battery 1 further includes the second anode active material layer 23 that is formed, for example, between the solid electrolyte 30 and the first anode active material layer 22, by charging. Although not illustrated, the solid secondary battery 1 further includes the second anode active material layer 23 that is formed, for example, in the first anode active material layer 22 by charging.

The second anode active material layer 23 is a metal layer containing lithium or a lithium alloy. The metal layer includes lithium or a lithium alloy. Accordingly, since the second anode active material layer 23 is a metal layer containing lithium, the second anode active material layer 23 may act as, for example, a lithium reservoir. The lithium alloy is, for example, a Li—Al alloy, a Li—Sn alloy, a Li-ln alloy, a Li—Ag alloy, a Li—Au alloy, a Li—Zn alloy, a Li—Ge alloy, a Li—Si alloy, or the like, but is not limited thereto, and may be any suitable lithium alloy used in the art. The second anode active material layer 23 may consist of lithium or one of these alloys, or may consist of different alloys.

The second anode active material layer 23 has a thickness of, for example, but not specifically limited to, about 1 um to about 1,000 um, about 1 um to about 500 urn, about 1 um to about 200 um, about 1 um to about 150 um, about 1 um to about 100 um, or about 1 um to about 50 um. When the thickness of the second anode active material layer 23 is too small, it may be difficult for the second anode active material layer 23 to serve as a lithium reservoir. When the thickness of the second anode active material layer 23 is too large, the mass and volume of the solid secondary battery 1 increase, and rather the cyclic characteristics thereof are likely to be deteriorated. The second anode active material layer 23 may be, for example, a metal foil having a thickness within these ranges.

In the solid secondary battery 1, for example, the second anode active material layer 23 is disposed between the anode current collector 21 and the first anode active material layer 22 before assembly of the solid secondary battery, or the second anode active material layer 23 is deposited between the anode current collector 21 and the first anode active material layer 22 by charging after assembly of the solid secondary battery 1.

In a case where the second anode active material layer 23 is disposed between the anode electrode current collector 21 and the first anode active material layer 22 before assembly of the solid secondary battery 1, the second anode active material layer 23 is a metal layer including lithium and acts as a lithium reservoir. The solid secondary battery 1 including the second anode active material layer 23 has further improved cyclic characteristics. For example, before assembly of the solid secondary battery 1, a lithium foil may be disposed between the anode current collector 21 and the first anode active material layer 22.

In a case where the second anode active material layer 23 is deposited by charging after assembly of the solid secondary battery 1, the energy density of the solid secondary battery 1 is increased since the second anode active material 23 is not present when the solid secondary battery 1 is assembled. For example, when charging the solid secondary battery 1, the solid secondary battery 1 is charged to exceed the charge capacity of the first anode active material layer 22. That is, the first anode active material layer 22 is overcharged. At the initial stage of charging, lithium is absorbed into the first anode active material layer 22. That is, the anode active material included in the first anode active material layer 22 forms an alloy or compound with lithium ions migrated from the cathode 10. When charging is performed to exceed the capacity of the first anode active material layer 22, for example, lithium precipitates on the rear surface of the first anode active material layer 22, that is, between the anode current collector 21 and the first anode active material layer 22, and a metal layer, which corresponds to the second anode active material layer 23, is formed by the precipitated lithium. The second anode active material layer 23 is a metal layer consisting mainly of lithium (that is, lithium metal). This result is obtained, for example, because the anode active material included in the first anode active material layer 22 consists of a material that forms an alloy or compound with lithium. During discharging, lithium in the first anode active material layer 22 and the metal layers, as the second anode active material layer 23, is ionized and migrates toward the cathode 10. Accordingly, in the solid secondary battery 1, lithium may be used as an anode active material. In addition, since the first anode active material layer 22 covers the second anode active material layer 23, the first anode active material layer 22 acts as a protective layer for the second anode active material layer 23, that is, a metal layer, and at the same time inhibits the precipitation growth of lithium dendrites. Accordingly, a short circuit and capacity reduction in the solid secondary battery 1 are suppressed, and as a result, the solid secondary battery 1 has improved cyclic characteristics. In addition, in a case where the second anode active material layer 23 is deposited by charging after assembly of the solid secondary battery 1, the anode current collector 21, the first anode active material layer 22, and a region therebetween are, for example, Li-free regions that do not contain lithium (Li) metal or a Li alloy in the initial state or after discharge of the solid secondary battery.

Referring to FIG. 19, the solid secondary battery 1a according to an embodiment has a structure in which the second anode active material layer 23 is disposed on the anode current collector 21, and the solid electrolyte 30 is directly disposed on the first anode active material layer 22. The second anode active material layer 23 is, for example, a lithium metal layer or a lithium alloy layer. The solid electrolyte may be the solid electrolyte according to any of the embodiments or may further include a second solid electrolyte together with the solid electrolyte according to an embodiment.

The second solid electrolyte may include, for example, an oxide solid electrolyte, a sulfide electrolyte, or a combination thereof.

The sulfide solid electrolyte may include, for example, $Li_2S$—$P_2S_5$, $Li_2S$—$P_2S_5$—LiX (wherein X may be a halogen, for example, I, or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (wherein m and n may each be a positive number, and Z may be one of Ge, Zn, and Ga), $Li_2S$—$GeS_2$, $Li_2S$—$SiS_2$—$Li_3PO_4$, $Li_2S$—$SiS_2$—$Li_pMO_q$ (wherein p and q may each be a positive number, and M may be one of P, Si, Ge, B, Al, Ga, and In). The sulfide solid electrolyte material may be prepared by treatment of a starting material (for example, $Li_2S$ or $P_2S_5$) using a melt quenching method or a mechanical milling method. In addition, after this treatment, heat treatment may be performed. The sulfide solid electrolyte may be amorphous, crystalline, or a mixture thereof.

The solid electrolyte may use a sulfide solid electrolyte material as described above, including at least sulfur (S), phosphorous (P), and lithium (Li) as constituent elements, for example, a material including $LI_2S$—$P_2S_5$. When the solid electrolyte uses a sulfide solid electrolyte material including $LI_2S$—$P_2S_5$, a mixed molar ratio of $LI_2S$ to $P_2S_5$ ($LI_2S$:$P_2S_5$) may be selected to be in a range of, for example, about 50:50 to about 90:10.

The solid electrolyte 30 may further include a binder.

The binder included in the solid electrolyte 30 may be, for example, styrene-butadiene rubber (SBR), polytetrafluoroethylene, polyvinylidene fluoride, or polyethylene. The binder of the solid electrolyte 30 may be identical to or different from the binders of the cathode active material layer 12 and the first anode active material layer 22.

One or more embodiments of the present disclosure will now be described in detail with reference to the following examples. However, these examples are only for illustrative purposes and are not intended to limit the scope of the one or more embodiments of the present disclosure.

EXAMPLES

Example 1

LiCl (water content: 3.43 wt %) and $GaF_3$ were mixed in a 2:1 molar ratio to obtain a mixture, and the mixture was subjected to high-energy milling for 10 minutes by ball milling using Pulverisette 7 Premium line equipment at 700 rpm. After the high-energy milling, the resulting product was cooled down by being left to stand for 5 minutes (one cycle). This cycle of the steps of high-energy milling and leaving to stand was repeatedly performed for 72 cycles in total, to thereby obtain a compound in clay form having the composition as in Table 1.

Examples 2 and 3

Compounds in clay form having the compositions as in Table 1 were obtained according to the same method as in Example 1, except that the mixed molar ratio of LiCl to $GaF_3$ was varied to 3:1 and 4:1, respectively.

Example 4

A compound in clay form having the composition as in Table 1 was obtained according to the same method as in Example 2, except that LiBr was used instead of LiCl.

Example 5

A compound in clay form having the composition as in Table 1 was obtained according to the same method as in Example 1, except that LiCl, LiOH, and $GaF_3$ were used instead of LiCl and $GaF_3$, and a mixed molar ratio of LiCl, LiOH, and $GaF_3$ was 2:1:1.

Example 6

A compound in clay form having the composition as in Table 1 was obtained according to the same method as in Example 1, except that LiCl, $LaCl_3$, and $GaF_3$ were used instead of LiCl and $GaF_3$, and a mixed molar ratio of LiCl, $LaCl_3$, and $GaF_3$ was 3:0.1:0.9.

Example 7

A compound in clay form having the composition as in Table 1 was obtained according to the same method as in Example 1, except that LiCl, $InCl_3$, and $GaF_3$ were used instead of LiCl and $GaF_3$, and a mixed molar ratio of LiCl, $InCl_3$, and $GaF_3$ was 3:0.1:0.9.

Example 8

LiCl (water content: 3.43 wt %) was dried in a 180° C. vacuum oven for 12 hours to obtain anhydrous LiCl.

A compound in clay form was obtained according to the same method as in Example 1, except that the anhydrous LiCl was used instead of LiCl (water content: 3.43 wt %) and the mixing molar ratio of LiCl and $GaF_3$ was changed to 3:1.

Examples 1-1 to 1-3

Compounds in clay form having the compositions as in Table 1 were obtained according to the same method as in Example 1, except that the compositions of the starting materials were changed to obtain the Compounds having the compositions as in Table 1.

Examples 1-4 to 1-7

Compounds in clay form having the compositions as in Table 1 were obtained according to the same method as in Example 1, except that the compositions of the starting materials were changed to obtain the Compounds having the compositions as in Table 1.

Comparative Example 1

A compound in powder form having the composition as in Table 1 was obtained according to the same method as in Example 1, except that LiOH was used instead of LiCl, and a mixed molar ratio of LiOH and $GaF_3$ was 3:1.

Comparative Example 2

A compound in powder form having the composition as in Table 1 was obtained according to the same method as in Example 1, except that $Li_2O$ was used instead of LiCl, and a mixed molar ratio of $Li_2O$ and $GaF_3$ was 1:1.

Comparative Example 3

A compound in powder form having the composition as in Table 1 was obtained according to the same method as in Example 1, except that LiCl and $LaF_3$ were used instead of LiCl and $GaF_3$, and a mixed molar ratio of LiCl and $LaF_3$ was 3:1.

Comparative Example 4

A compound in powder form having the composition as in Table 1 was obtained according to the same method as in Example 1, except that LiCl and $InF_3$ were used instead of LiCl and $GaF_3$, and a mixed molar ratio of LiCl and $InF_3$ was 3:1.

Comparative Example 5

A compound in powder form having the composition as in Table 1 was obtained according to the same method as in Example 1, except that LiCl and $Ga_2O_3$ were used instead of LiCl and $GaF_3$, and a mixed molar ratio of LiCl and $Ga_2O_3$ was 6:1.

Comparative Example 6

LiCl and $GaF_3$ were mixed in a 2:1 molar ratio to obtain a mixture, and the mixture was subjected to high-energy milling for 10 minutes by ball milling using Pulverisette 7 Premium line equipment at 700 rpm.

After the high-energy milling, the resulting product was cooled down by being left to stand for 5 minutes (one cycle). After the cooling step, heat treatment was performed at 200° C. for 720 minutes.

In Comparative Example 6, through the above-described processes, a compound exhibiting a glass transition phenomenon could not be obtained.

Comparative Example 7

A compound in powder form having the composition as in Table 1 was obtained according to the same method as in Example 1, except that LiCl and $GaCl_3$ were used instead of LiCl and $GaF_3$, and a mixed molar ratio of LiCl and $GaCl_3$ was 3:1.

Comparative Example 8

A compound in powder form having the composition as in Table 1 was obtained according to the same method as in Example 1, except that LiCl and $GaCl_3$ were used instead of LiCl and $GaF_3$, and a mixed molar ratio of LiCl and $GaCl_3$ was 1:1.

Comparative Example 9

A compound in powder form having the composition as in Table 1 was obtained according to the same method as in Example 1, except that LiCl and $ScCl_3$ were used instead of LiCl and $GaF_3$, and a mixed molar ratio of LiCl and $ScCl_3$ was 3:1.

TABLE 1

| Example | Composition |
| --- | --- |
| Example 1 | $2LiCl$—$GaF_3$ |
| Example 2 | $3LiCl$—$GaF_3$ |
| Example 3 | $4LiCl$—$GaF_3$ |
| Example 4 | $3LiBr$—$GaF_3$ |
| Example 5 | $2LiCl$—$LiOH$—$GaF_3$ |
| Example 6 | $3LiCl$—$0.1LaCl_3$—$0.9GaF_3$ |
| Example 7 | $3LiCl$—$0.1InCl_3$—$0.9GaF_3$ |
| Example 1-1 | $2LiCl$—$1NaCl$—$GaF_3$ |
| Example 1-2 | $2LiCl$—$1KCl$—$GaF_3$ |
| Example 1-3 | $3LiCl$—$GaF_2Cl$ |
| Example 1-4 | $3LiCl$—$0.1AlCl_3$—$0.9GaF_3$ |

TABLE 1-continued

| Example | Composition |
| --- | --- |
| Example 1-5 | $3LiCl—0.1ScCl_3—0.9GaF_3$ |
| Example 1-6 | $3LiCl—0.1YCl_3—0.9GaF_3$ |
| Example 1-7 | $3LiCl—0.1BCl_3—0.9GaF_3$ |
| Comparative Example 1 | $3LiOH—GaF_3$ |
| Comparative Example 2 | $Li_2O—GaF_3$ |
| Comparative Example 3 | $3LiCl—LaF_3$ |
| Comparative Example 4 | $3LiCl—InF_3$ |
| Comparative Example 5 | $6LiCl—Ga_2O_3$ |
| Comparative Example 6 | $2LiCl—GaF_3$ |
| Comparative Example 7 | $3LiCl—GaCl_3$ |
| Comparative Example 8 | $LiCl—GaCl_3$ |
| Comparative Example 9 | $3LiCl—ScCl_3$ |

Comparative Example 10

LiCl and $GaF_3$ were mixed in a 1:1 molar ratio to obtain a mixture, and the mixture was subjected to high-energy milling for 10 minutes by ball milling using Pulverisette 7 Premium line equipment at 700 rpm. After the high-energy milling, the resulting product was cooled down by being left to stand for 5 minutes (one cycle). This cycle of the steps of high-energy milling and leaving to stand was repeatedly performed 72 cycles in total.

The resulting product was heat-treated at about 300° C. to obtain $LiClGaF_3$ in powder form.

Comparative Example 11

$LiGaCl_4$ in powder form was obtained according to the same method as in Comparative Example 10, except that LiCl and $GaCl_3$ were used instead of LiCl and $GaF_3$.

Comparative Example 12

LiCl and $GaF_3$ were mixed in a 1:1 molar ratio to prepare a blend of LiCl and $GaF_3$ in powder form.

Comparative Example 13

NaCl and $GaF_3$ were mixed in a 1:1 molar ratio to obtain a mixture, and the mixture was subjected to high-energy milling for 10 minutes by ball milling using Pulverisette 7 Premium line equipment at 700 rpm. After the high-energy milling, the resulting product was cooled down by being left to stand for 5 minutes (one cycle). This cycle of the steps of high-energy milling and leaving to stand was repeatedly performed 72 cycles in total, to thereby obtain $NaCl—GaF_3$ in powder form.

As a result of differential scanning calorimetry (DSC) on $NaCl—GaF_3$ obtained in Comparative Example 13, it was found that $NaCl—GaF_3$ did not exhibit a glass transition phenomenon and had a low ionic conductivity of 0.005 mS/cm.

Manufacture Example 1: Manufacture of Solid Secondary Battery

First, a cathode was manufactured according to the following processes.

$LiNi_{0.8}Co_{0.15}Mn_{0.05}O_2$ (NCM), a conductive agent (Super-P; Timcal Ltd.), polyvinylidene fluoride (PVdF), and N-methylpyrrolidone were mixed to obtain a cathode active material layer formation composition. In the cathode active material layer formation composition, a mixed weight ratio of NCM, the conductive agent, and PVDF was 97:1.5:1.5, wherein the amount of N-methylpyrrolidone was about 137 g when the amount of NCM was 97 g.

After the cathode active material layer formation composition was coated on an aluminum foil (having a thickness of about 15 μm) and dried at 25° C., the dried product was dried in a vacuum at about 110° C. to thereby manufacture a cathode.

The cathode was impregnated with an ionic liquid-containing electrolyte. This ionic liquid-containing electrolyte was obtained by mixing N-methyl-N-propylpyrrolidinium bis(trifluoromethanesulfonyl)imide (PYR13TFSI) as an ionic liquid and lithium bistrifluoromethanesulfonimide (LiTFSI) as a lithium salt, and stirring the mixture at room temperature (25° C.). A mixed weight ratio of the ionic liquid and the lithium salt was 10:100.

A lithium metal anode (having a thickness of about 20 μm) was arranged on a current collector (copper foil), and a first oxide solid electrolyte, a solid electrolyte containing the compound of Example 1, and a second oxide solid electrolyte were stacked on the lithium metal anode, and then bound together according to a cold isostatic pressing (CIP) method by applying about 250 MPa, to thereby manufacture a structure of lithium anode/first oxide solid electrolyte/solid electrolyte/second oxide solid electrolyte.

An LLZO $(Li_{6.5}La_3Zr_{1.5}Ta_{0.5}O_{12})$ membrane and an LLZO $(Li_{6.5}La_3Zr_{1.5}Ta_{0.5}O_{12})$ membrane were used as the first oxide solid electrolyte and the second oxide solid electrolyte, respectively. The solid electrolyte containing the compound of Example 1 was formed with a thickness of 100 μm by uniaxial pressing at a pressure of 200 MPa.

The cathode impregnated with the ionic liquid-containing electrolyte was attached to an upper surface of the structure of lithium anode/first oxide solid electrolyte/solid electrolyte/second oxide solid electrolyte, and heat-treated at about 60° C., to thereby manufacture a sandwich-type secondary battery including the lithium anode/first oxide solid electrolyte/solid electrolyte/second oxide solid electrolyte/ionic liquid-containing liquid electrolyte/cathode.

Manufacture Example 2: Manufacture of Solid Secondary Battery

First, a cathode was manufactured according to the following processes.

$LiNi_{0.8}Co_{0.15}Mn_{0.05}O_2$ (NCM), a conductive agent (Super-P; Timcal Ltd.), polyvinylidene fluoride (PVdF), and N-methylpyrrolidone were mixed to obtain a cathode active material layer formation composition. In the cathode active material layer formation composition, a mixed weight ratio of NCM, the conductive agent, and PVDF was 97:1.5:1.5, and the amount of N-methylpyrrolidone was about 137 g when the amount of NCM was 97 g.

After the cathode active material layer formation composition was coated on an aluminum foil (having a thickness of about 15 μm) and dried at 25° C., the dried product was dried in a vacuum at about 110° C. to thereby manufacture a cathode.

A lithium metal anode (having a thickness of about 20 μm) was arranged on a current collector (copper foil), and an oxide solid electrolyte (LLZTO: $Li_{6.5}La_3Zr_{1.5}Ta_{0.5}O_{12}$) was arranged on the lithium metal anode, and a solid electrolyte containing the compound of Example 1 was arranged on the oxide solid electrolyte. Subsequently, the cathode was arranged on the solid electrolyte and then pressed together according to a cold isostatic pressing (CIP) method by applying about 250 MPa for 3 minutes, to thereby manufacture a solid secondary battery including the lithium anode/LLZO membrane/solid electrolyte containing the compound of Example 1/cathode.

The solid electrolyte containing the compound of Example 1 was formed with a thickness of 100 μm by uniaxial pressing at a pressure of 200 MPa.

Evaluation Example 1: X-Ray Diffraction (XRD) Analysis

XRD spectra of the compounds obtained according to Examples 1 to 3 were measured, and the results are shown in FIG. 1. For the XRD spectrum measurement, Cu Kα radiation was used, and the X-ray diffraction analysis was performed using a Bruker's D8 Advance.

Referring to FIG. 1, it was observed that the compound of Example 1 (2LiCl—GaF$_3$) exhibited main peaks at diffraction angles (2θ) of 29° to 31°, and a minor peak near at a diffraction angle (2θ) of 50°. It was observed that the compound of Example 2 (3LiCl—GaF$_3$) and the compound of Example 3 (4LiCl—GaF$_3$) exhibited main peaks at diffraction angles (2θ) of 29° to 31°, and minor peaks at diffraction angles (2θ) of 50°, 59°, and 63°.

Evaluation Example 2: Scanning Electron Microscopy

Scanning electron microscopy (SEM) was performed on the compound of Example 1. The SEM analysis was performed using a Hitachi SU 8030 FE-SEM. The SEM analysis results are shown in FIG. 2.

Figure 2:
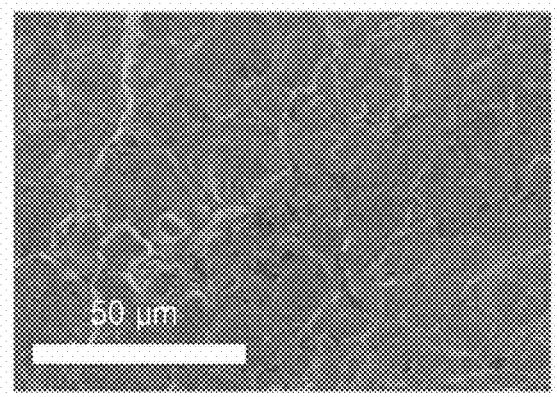
FIG. 2 illustrates results of scanning electron microscopy analysis of the compound of Example 1.

Referring to FIG. 2, it was found that the compound of Example 1 had amorphous phase since grain boundaries were not formed.

Evaluation Example 3: X-Ray Photoelectron Spectroscopy (XPS)

Binding energies of the compound of Example 1 were measured using an X-ray photoelectron spectrometer (Thermo Fisher Scientific, Multilab-2000), and the analysis results are shown in FIGS. 3A to 3D.

The upper graphs in FIGS. 3A to 3D represent results of XPS analysis of Li1s, Ga 2p3/2, F1s, and Cl2p, respectively, of the compound of Example 1, and the lower graphs in FIGS. 3A to 3D represent those of LiCl, GaF$_3$, GaF$_3$, and LiCl, respectively, for comparison with the upper graphs.

Figure 3A:
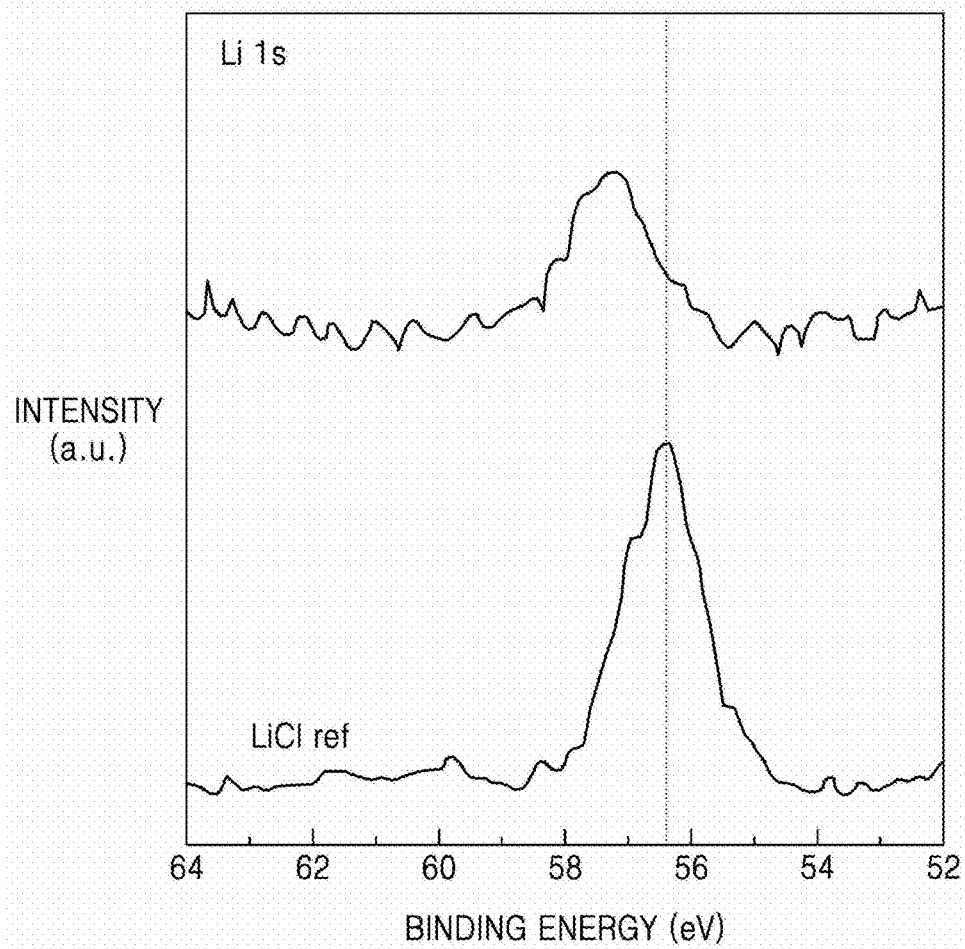
FIGS. 3A to 3D are each a graph of intensity (a.u.) versus binding energy (electron-volts (eV)) and illustrate the results of X-ray photoelectron spectroscopy (XPS) analysis of the compound of Example 1.

Referring to FIG. 3A, the Li1s peak of the compound of Example 1 appeared to be different from the LiCl peak.

Figure 3B:
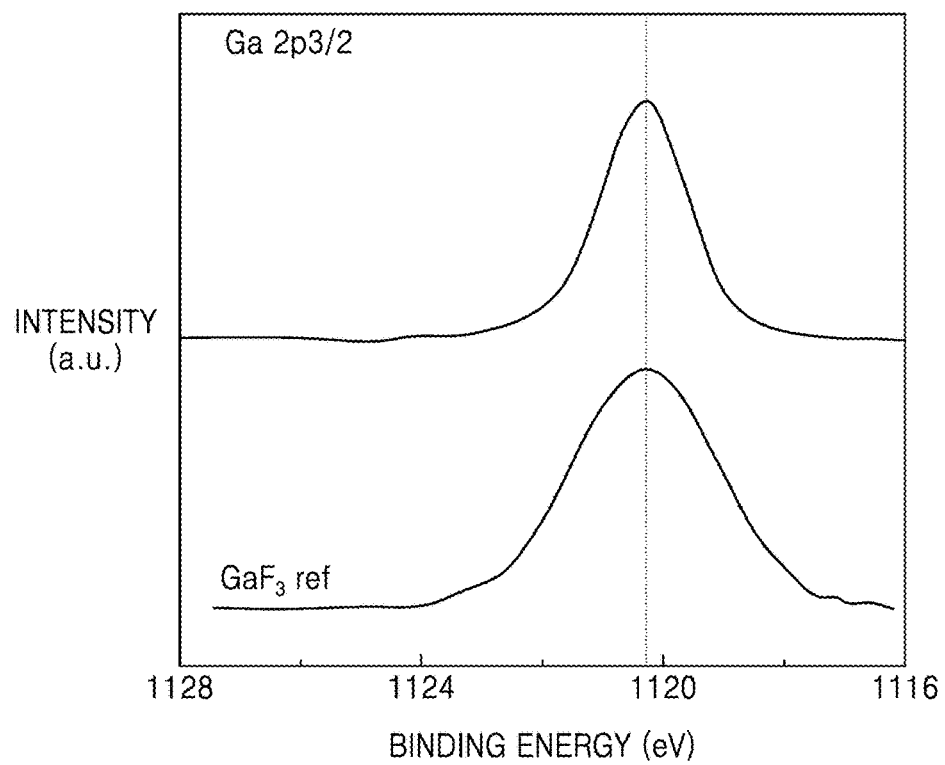
Figure 3C:
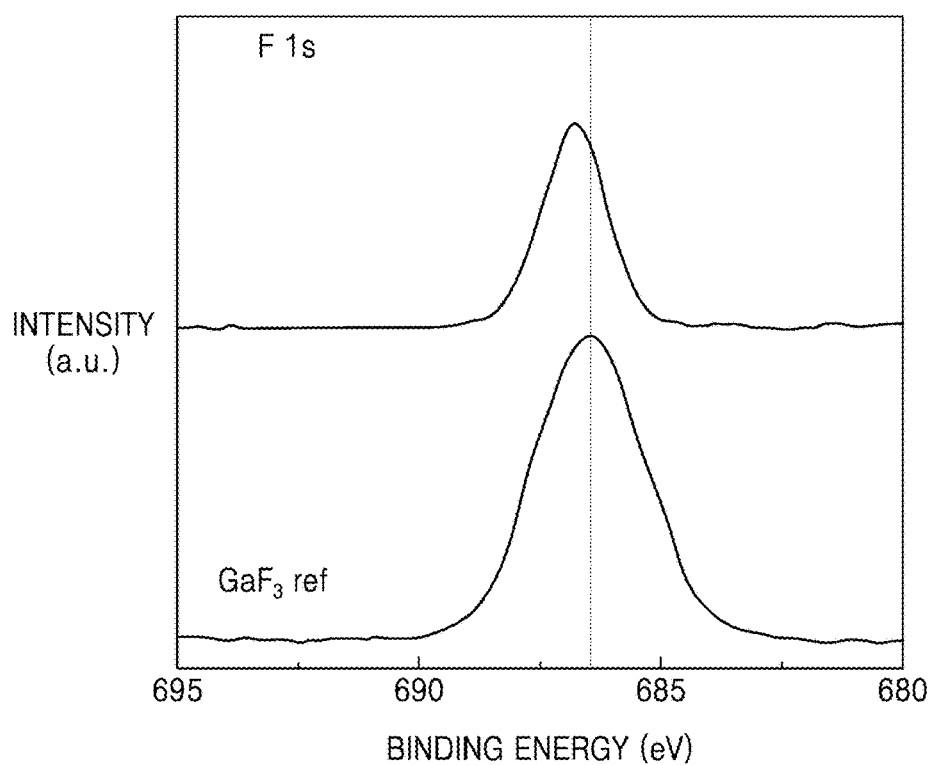

Referring to FIGS. 3B and 3C, the Ga 2p3/2 and F1s peaks of the compound of Example 1 represented the same results as GaF$_3$ peak. In addition, as is known from FIG. 3D, the Cl 2p peak of the compound of Example 1, which is attributed to Ga—Cl bonds, was observed in the binding energy region of 200 to 203 eV.

Figure 3D:
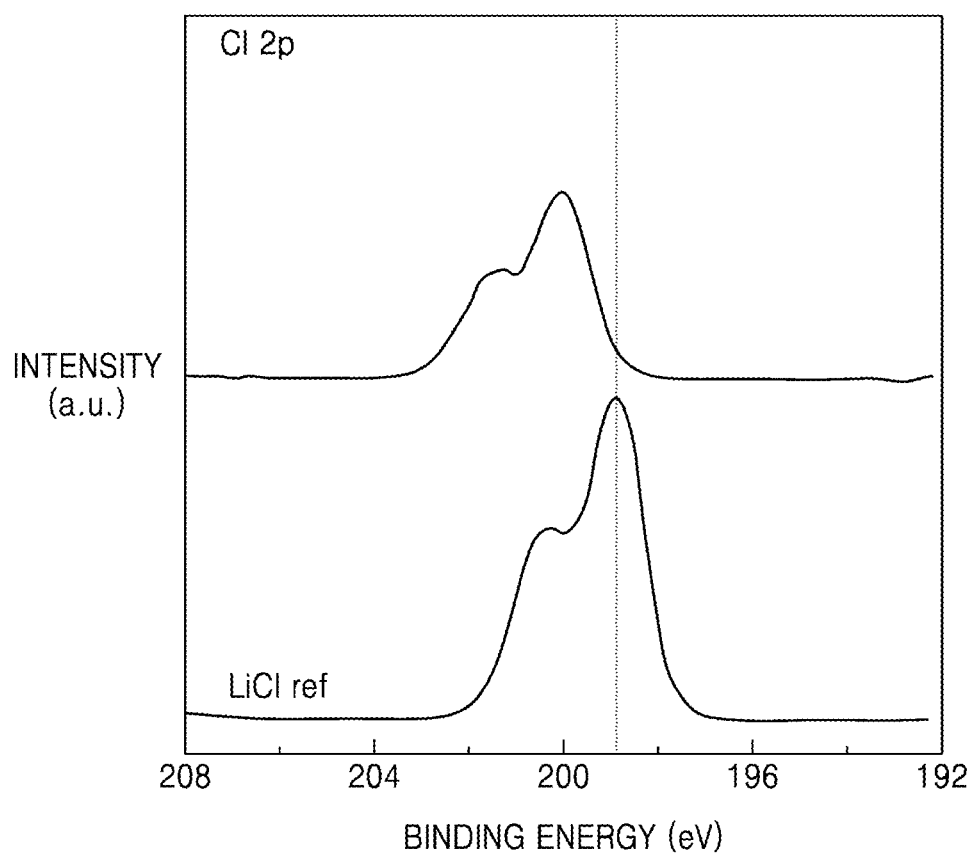

From the results of FIG. 3D, it was found that the Cl 2p peak of the compound of Example 1 was shifted in the high binding energy direction, as compared with the Cl 2p peak of a simple blend of LiX and GaF$_3$. From this result, it was found that the compound of Example 1 was a composite having Ga—Cl bonds, unlike the blend of LiCl and GaF$_3$ obtained according to Comparative Example 12.

Evaluation Example 4: Measurement of Ionic Conductivity and Activation Energy (1) Examples 1 to 7, Examples 1-1 to 1-7, and Comparative Examples 1 to 8, 12, and 13

The compounds in clay form (referred to also as clay compounds) of Examples 1 to 7 and Examples 1-1 to 1-7 and the compounds in powder form (referred to also as powder compounds) of Comparative Examples 1 to 8, 12 and 13 were analyzed in terms of ionic conductivity and active energy as follows. About 0.2 g of each of the clay compounds of Examples 1 to 7 and 1-1 to 1-7 was placed between SUS plates, each having a diameter of 16 mm and a thickness of 500 um, in the form of SUS/compound/SUS, and a uniaxial pressure of 100 to 200 kg was applied thereto for 10 seconds to thereby form a circular SUS/compound/SUS structure. About 1 g of each of the powder compounds of Comparative Examples 1 to 8, 12, and 13 was put into a pelletizer having a diameter of 13 mm, and a uniaxial pressure of 5 ton was applied for 2 minutes to thereby form pellets in circular disc form. SUS electrodes were placed on opposite sides of each pellet and a pressure was applied at a torque of 4 Nm to thereby form a SUS/pellet/SUS structure.

Figure 4A:
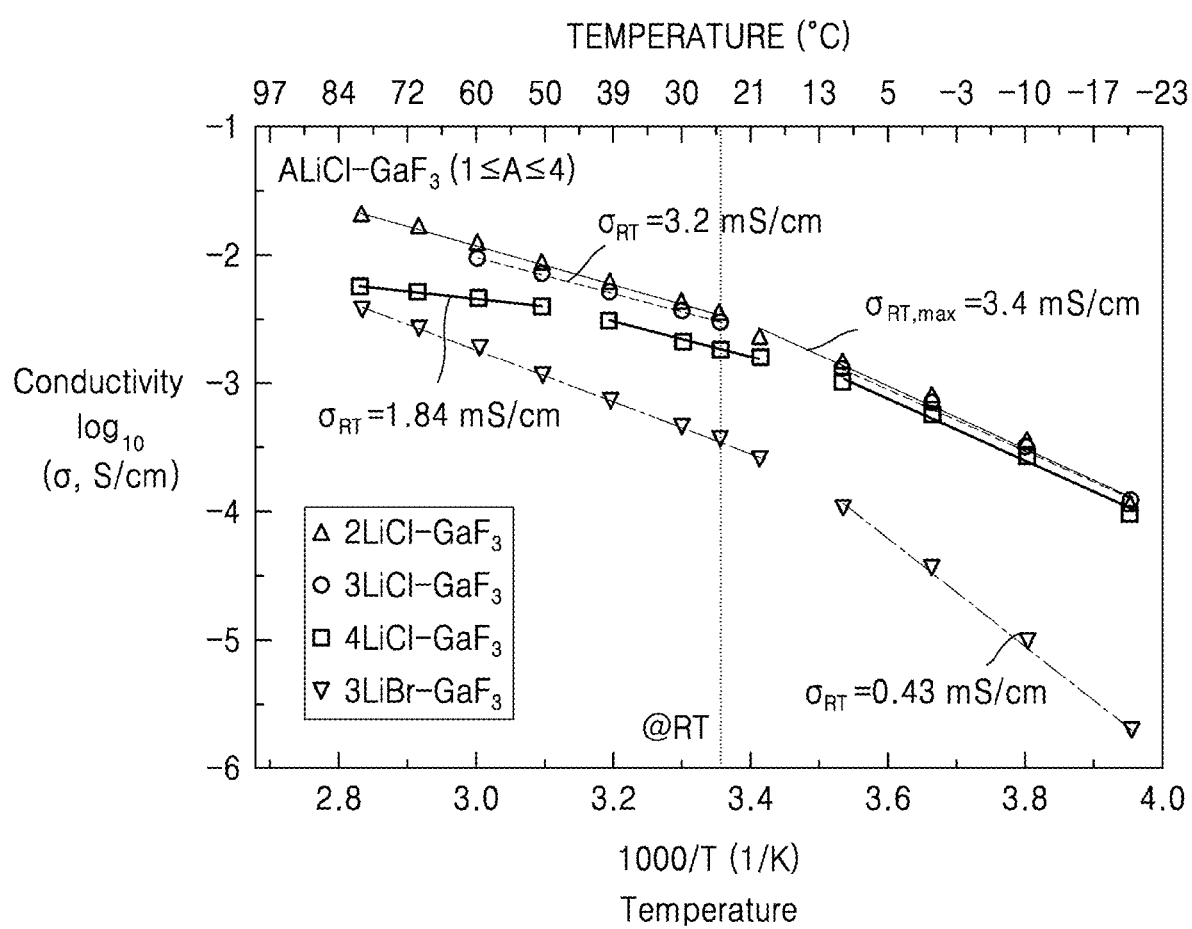
FIG. 4A is a graph of conductivity (Siemens per centimeter (S/cm)) versus temperature (1000/T(1/K)) and shows the results of Arrhenius analysis of the compounds of Examples 1 to 4.

A potentiostatic impedance measurement method was applied to measure the resistance of each SUS/pellet/SUS structure in a range of −20° C. to 80° C. at open circuit voltage while the 10 mV alternating current was varied from 1 MHz to 0.01 Hz for impedance evaluation, and the results are shown in FIG. 4A.

The total resistance ($R_{total}$) was obtained from the impedance results, and conductivity values were calculated from this value via calibration of electrode's area and pellet's thickness. From the results of the electrochemical impedance spectroscopy (EIS) measured while changing the temperature of a chamber into which each oxide sample was loaded, a value of activation energy (Ea) for lithium (Li) ion conduction was calculated. The values of conductivity measured with respect to temperature in the range of 298K to 378K were converted into the Arrhenius plot (Ln(σT) vs. 1/T) of Equation 1, and the values of activation energy (Ea) were calculated from the slope of the Arrhenius plot.

$$\sigma T = A \exp(Ea/RT) \quad \text{Equation 1}$$

In Equation 1, Ea is the activation energy, T represents absolute temperature, A represents the pre-exponential factor, R is the gas constant, and σ represents the conductivity.

The values of activation energy obtained according to the above procedure are shown in Table 2, and the ionic conductivity of each compound is shown in FIG. 4A.

TABLE 2

| Example | Composition | Ionic conductivity (@25° C., mS/cm) | Activation energy (meV) |
|---|---|---|---|
| Example 1 | 2LiCl—GaF$_3$ | 3.43 | 274.86 |
| Example 2 | 3LiCl—GaF$_3$ | 3.2 | 299.0 |
| Example 3 | 4LiCl—GaF$_3$ | 1.84 | 267.12 |
| Example 4 | 3LiBr—GaF$_3$ | 0.43 | 411.28 |
| Example 5 | 2LiCl—LiOH—GaF$_3$ | 2.0 | 278.83 |
| Example 6 | 3LiCl—0.1LaCl$_3$—0.9GaF$_3$ | 1.34 | 309.32 |
| Example 7 | 3LiCl—0.1InCl$_3$—0.9GaF$_3$ | 2.32 | 309.04 |
| Example 1-4 | 3LiCl—0.1AlCl$_3$—0.9GaF$_3$ | 9.34 *10$^{-3}$ | 758.4 |
| Example 1-5 | 3LiCl—0.1ScCl$_3$—0.9GaF$_3$ | 2.66 | 264.34 |
| Comparative Example 1 | 3LiOH—GaF$_3$ | 0.17 | 329.82 |
| Comparative Example 2 | Li$_2$O—GaF$_3$ | 6.72 * 10$^{-3}$ | — |
| Comparative Example 3 | 3LiCl—LaF$_3$ | 2.73 * 10$^{-3}$ | — |
| Comparative Example 4 | 3LiCl—InF$_3$ | 1.02 * 10$^{-2}$ | — |
| Comparative Example 5 | 6LiCl—Ga$_2$O$_3$ | Not available | — |
| Comparative Example 6 | 2LiCl—GaF$_3$ | 3.99 * 10$^{-3}$ | — |

TABLE 2-continued

| Example | Composition | Ionic conductivity (@25° C., mS/cm) | Activation energy (meV) |
|---|---|---|---|
| Comparative Example 7 | 3LiCl—GaCl$_3$ | 1.57 * 10$^{-2}$ | — |
| Comparative Example 8 | LiCl—GaCl$_3$ | 7.48 * 10$^{-3}$ | — |
| Comparative Example 12 | LiCl—GaF$_3$ | 0.015 | — |
| Comparative Example 13 | NaCl—GaF$_3$ | 0.005 | — |

As shown in FIG. 4A, the compounds of Examples 1 to 4 were found to have excellent ionic conductivity in the range of various temperatures. In particular, the compound of Example 2 exhibited, as shown in FIG. 4A, an ionic conductivity of 3.4 mS/cm at room temperature (25° C.). Referring to Table 2, it was also found that the compounds of Examples 1 to 7 had greatly improved conductivity, as compared with the compounds of Comparative Examples 1 to 4, 6 to 8, 12, and 13. The ionic conductivity of the compound of Comparative Example 5 was not measured as it was beyond the measurable range.

The compounds of Examples 1, 1-5, 2, 3, 5 to 9 exhibited lower activation energies of less than 0.37 eV/atom, as compared with those of the compounds of Comparative Examples 1 to 3. Thus, when the activation energies of the compounds are reduced, the compounds exhibit improved ionic conductivities at low temperature.

In addition, the compounds of Examples 1-1 to 1-3 exhibited equivalent levels of ionic conductivity as that of the compound of Example 1. The compounds of Examples 1-4 and 1-5 also exhibited excellent conductivities, and the compounds of Examples 1-6 and Example 1-7 exhibited similar conductivities to that of the compound of Example 6.

(2) Example 8

Figure 21:
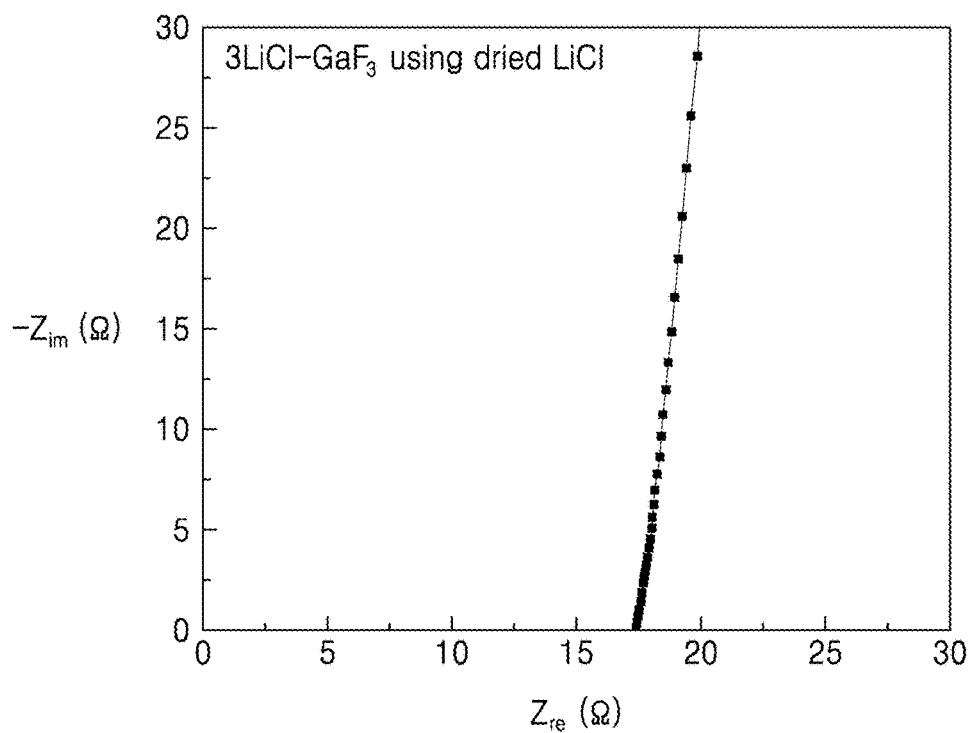
FIG. 21 is a graph of imaginary impedance ($-Z_{im}$, Ω) versus real impedance ($Z_{re}$, Ω) and illustrates impedance characteristics of compound prepared according to Example 8.

The ionic conductivity of the compound in clay form obtained according to Example 8 was evaluated in the same manner as applied to the compound in clay form of Example 1, and the evaluation results are shown in FIG. 21 and Table 3.

FIG. 21 illustrates impedance characteristics of the compound in clay form obtained according to Example 8.

TABLE 3

| Example | Composition | Ionic conductivity (@RT, mS/cm) |
|---|---|---|
| Example 8 | 3LiCl—GaF$_3$ | 1.4 |

Referring to FIG. 21 and Table 3, it was found that the compound of Example 8 had excellent ionic conductivity.

Evaluation Example 5: Cyclic Voltammetry

After attaching Li on one surface of Li$_{6.5}$La$_3$Zr$_{1.5}$Ta$_{0.5}$O$_{12}$ (LLZTO, Toshima Manufacturing Co.) pellet by cold isostatic pressing (CIP) at 250 MPa for 3 minutes, the compound in clay form of Example 1, as an electrolyte, was disposed on the other surface of the LLZTO pellet by uniaxial pressing at 500 kg to thereby form a Li/LLZTO/electrolyte structure.

The Li/LLZTO/electrolyte structure was analyzed by cyclic voltammetry (a scan rate of 0.2 mV/s and a voltage of 0.01 V to 5.0V). The cyclic voltammetry analysis results are shown in FIG. 4B.

Figure 4B:
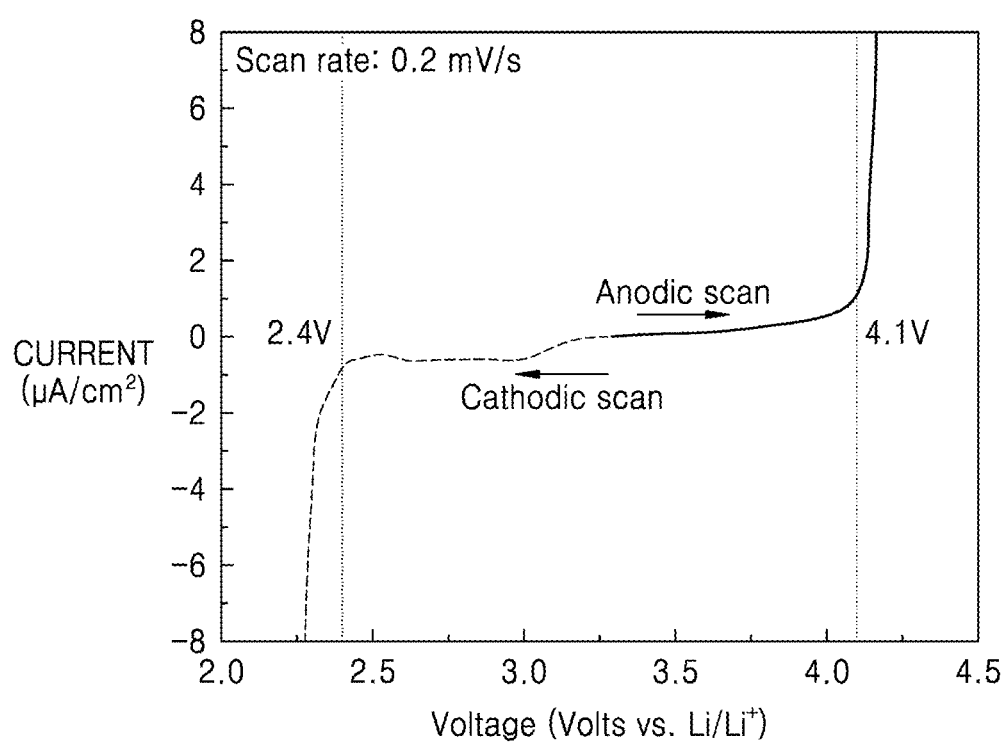
FIG. 4B is a graph of current (microamperes per square centimeter (μA/cm²)) versus voltage (Volts (V) versus Li/Li⁺) and illustrates results of cyclic voltammetry analysis of the compound of Example 1.

Referring to FIG. 4B, it was found that the compound of Example 1 was stable at up to 4.1V$_{Li/Li+}$.

Evaluation Example 6: Differential Scanning Calorimetry

Differential scanning calorimetry (DSC) was performed on the compounds Examples 1 to 3 and the compound of Comparative Example 9. The DSC was performed using a TA Instruments Discovery DSC at a starting temperature of −80° C., a termination temperature of 160° C., and a temperature increase rate of 10° C./minute under a nitrogen atmosphere.

Figure 5:
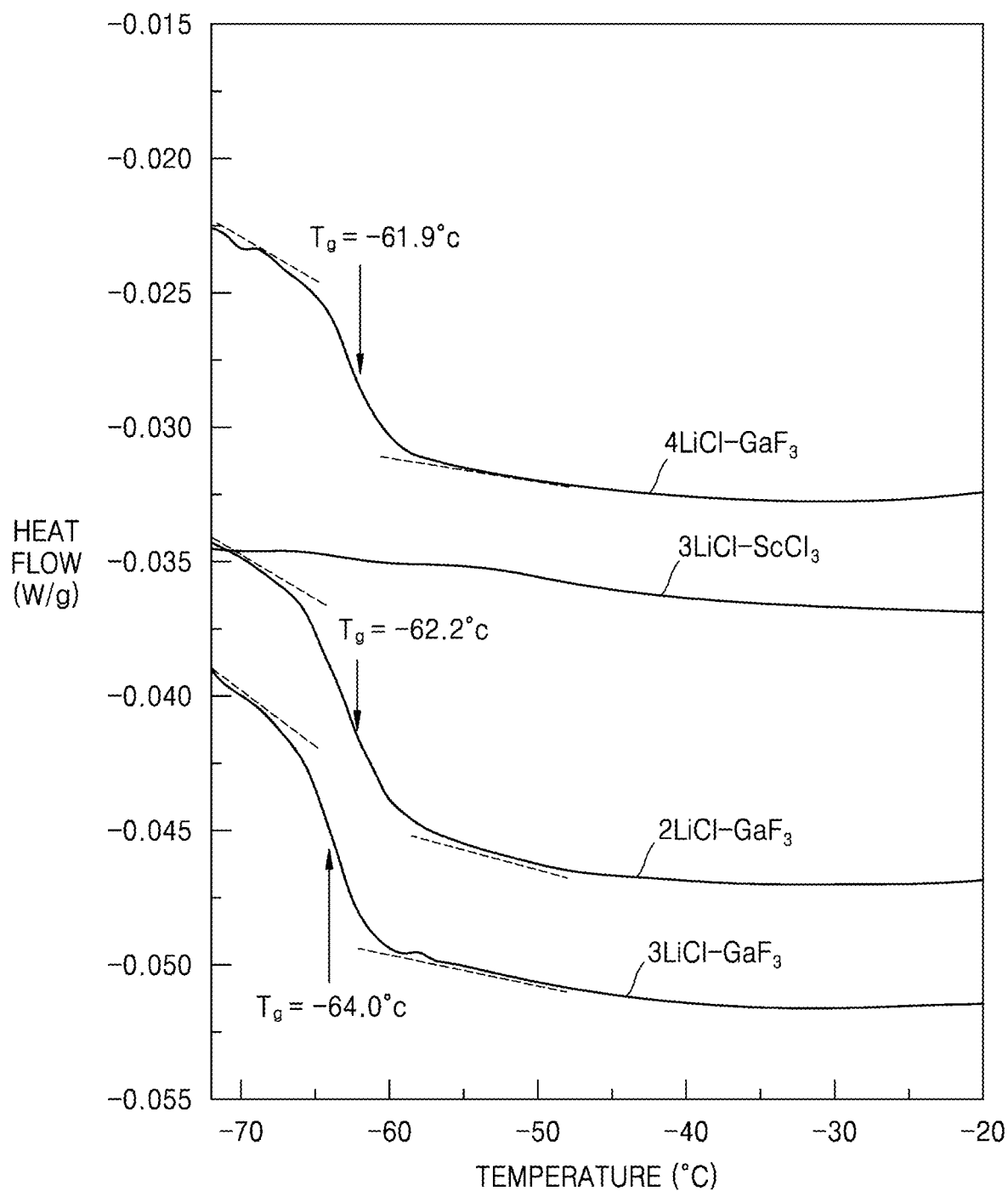
FIG. 5 is a graph of specific heat (Watts per gram (W/g)) versus temperature (° C.) and illustrates results of differential scanning calorimetry (DSC) analysis of the compounds of Examples 1 to 3 and Comparative Example 9.

The DSC analysis results are shown in FIG. 5. In FIG. 5, 2LiCl—GaF$_3$, 3LiCl—GaF$_3$ and 4LiCl—GaF$_3$ represent the compounds of Examples 1 to 3, respectively, and LiCl-3ScCl$_3$ represents the compound of Comparative Example 9.

The compounds of Examples 1 to 3 exhibited a glass transition phenomenon as shown in FIG. 5. A glass transition phenomenon at 60° C. or higher refers to a phenomenon in which viscosity and rubber-like properties are exhibited at a certain temperature or higher, and exhibits characteristics in which the slope of heat flow with respect to temperature in a DSC plot changes at a certain temperature and is the same above and below the certain temperature.

The compound of Example 1 had a glass transition temperature of −62.2° C., indicating that the compound of Example 1 had glass characteristics in the range of battery operation temperatures from −20° C. to 60° C.

The compound of Example 2 had a glass transition temperature of −64.0° C., and the compound of Example 3 had a glass transition temperature of −61.9° C.

DSC analysis was performed on the compounds of Comparative Examples 9 to 13 under the same conditions as the DSC analysis conditions of the compound of Example 1.

As a result of the DSC analysis, the compounds of Comparative Examples 9 to 13 did not exhibit a glass transition phenomenon in the temperature range of −60° C. to −30° C., unlike the compounds of Examples 1 to 3.

Evaluation Example 7: Rheology Characteristic Analysis

Viscosity was measured using rheology measurement equipment, i.e., a cone-and-plate rheometer (TA Instruments AR 2000). Each of the electrolyte samples using the compounds of Examples 1 to 3, respectively, was placed between a cone having a cone angle of 2° and a plate having a diameter of 40 mm, and then the interval between the cone and the plate was adjusted. Here, each electrolyte sample was prepared with a thickness of about 1 mm by applying 5 MPa of pressure to a compound in clay form with a uniaxial press.

After obtaining a cone/electrolyte/plate structure through the above processes, the cone was rotated repeatedly, and rheological evaluation was performed at room temperature (25° C.) at a 1% strain while varying the shear rate. The shear rate was in the range of 1.0 rad/s to 62.08 rad/s.

The storage modulus and loss modulus of each sample were measured while varying the angular frequency value.

Figure 6:
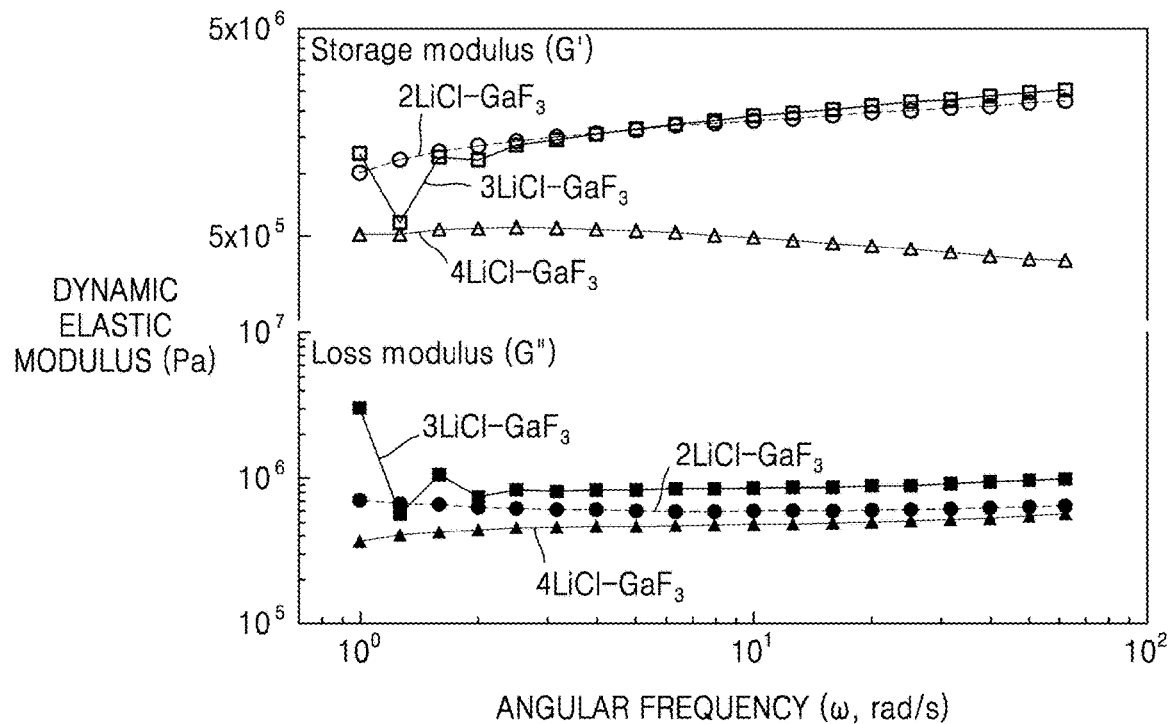
FIG. 6 is a graph of modulus (Pascals (Pa)) versus angular frequency (radians per second (rad/s)) illustrating the storage modulus and loss modulus of the compounds of Examples 1 to 3.

The measurement results are shown in FIG. 6. The storage modulus and loss modulus of each sample at an angular frequency of 10 rad/s are shown in Table 4.

TABLE 4

| Example | Composition | Storage modulus (Pa) | Loss modulus (Pa) |
|---|---|---|---|
| Example 1 | 2LiCl—GaF$_3$ | 1,805,000 (1.805 MPa) | 592,200 |
| Example 2 | 3LiCl—GaF$_3$ | 1,895,000 (1.895 MPa) | 852,600 |
| Example 3 | 4LiCl—GaF$_3$ | 495,600 (0.496 MPa) | 481,900 |

The compounds of Example 1 to 3 exhibited loss modulus and storage modulus characteristics as shown in Table 4.

Rheology characteristics of the compounds of Comparative Examples 1 to 8 were evaluated using the same rheology characteristic evaluation method as applied to the compounds of Examples 1 to 3.

As a result of the evaluation, the compounds of Examples 1 to 3. exhibited the rheology characteristics. The rheology characteristics as exhibited in the compounds of Comparative Examples 1 to 8 were not observed unlike the compounds of Examples 1 to 3.

Evaluation Example 8: Scanning Electron Microscopy/Energy-Dispersive X-Ray Spectroscopy (SEM/EDS) Analysis SEM-EDS analysis was performed on the solid secondary battery of Manufacture Example 2 to investigate the interfacial states of the cathode, the solid electrolyte (SE), and the LLZTO solid electrolyte and the distribution state of the solid electrolyte in the cathode. The SEM-EDS analysis was performed using a Hitachi SU 8030 FE-SEM.

Figure 9A:
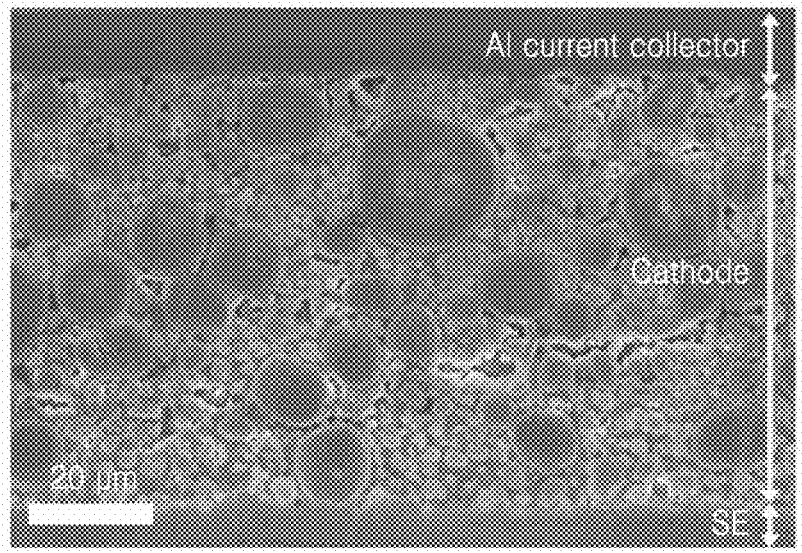
FIGS. 9A and 9B are scanning electron microscope (SEM) images showing the interfacial state of a cathode and a solid electrolyte (SE), and the interfacial state of the solid electrolyte (SE) and the oxide solid electrolyte $Li_{6.5}La_3Zn_{1.5}Ta_{0.5}O_{12}$ (LLZTO), respectively.
Figure 9B:
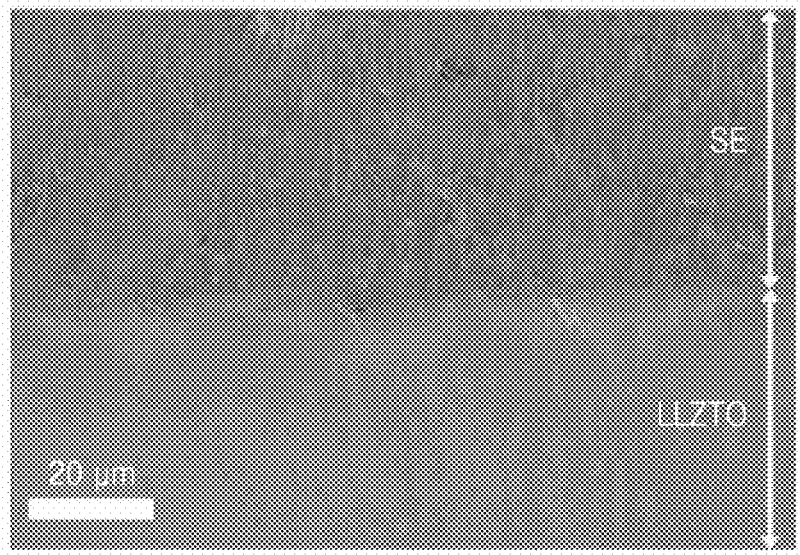
Figure 10A:
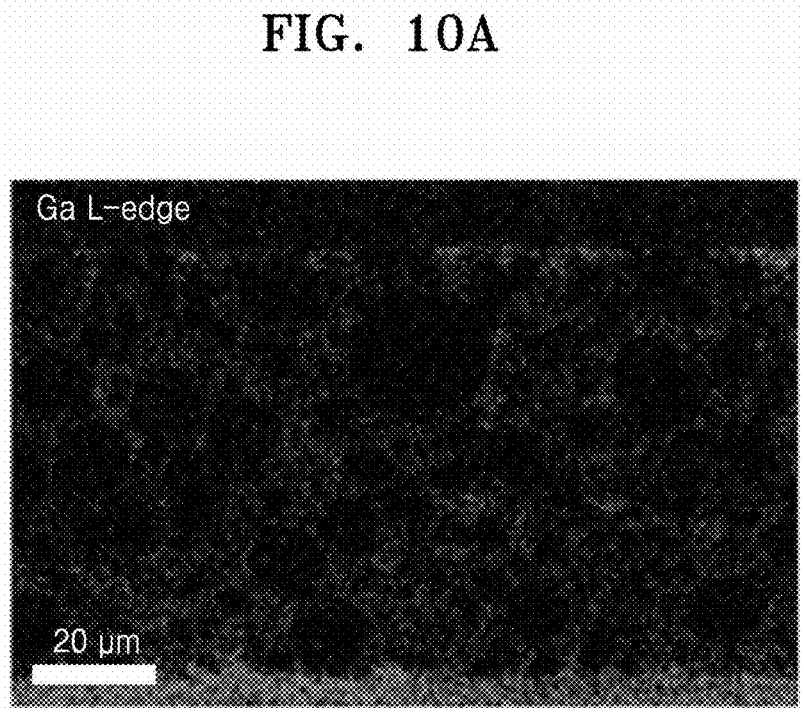
FIGS. 10A to 10F are results of energy-dispersive X-ray spectroscopy (EDS) analysis of the solid electrolyte including the compound of Example 1.
Figure 10B:
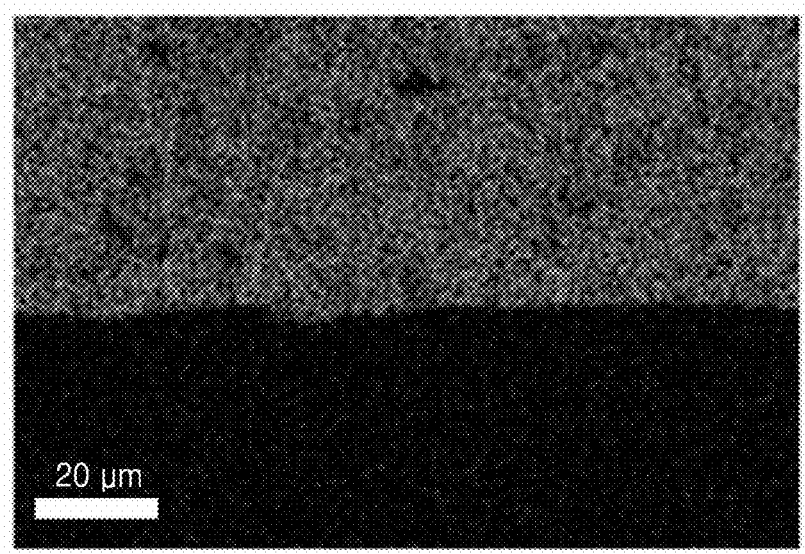
Figure 10C:
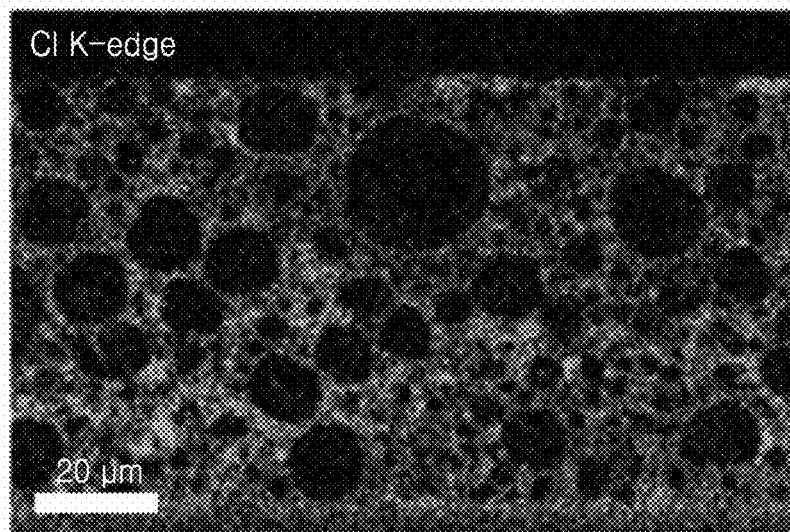
Figure 10D:
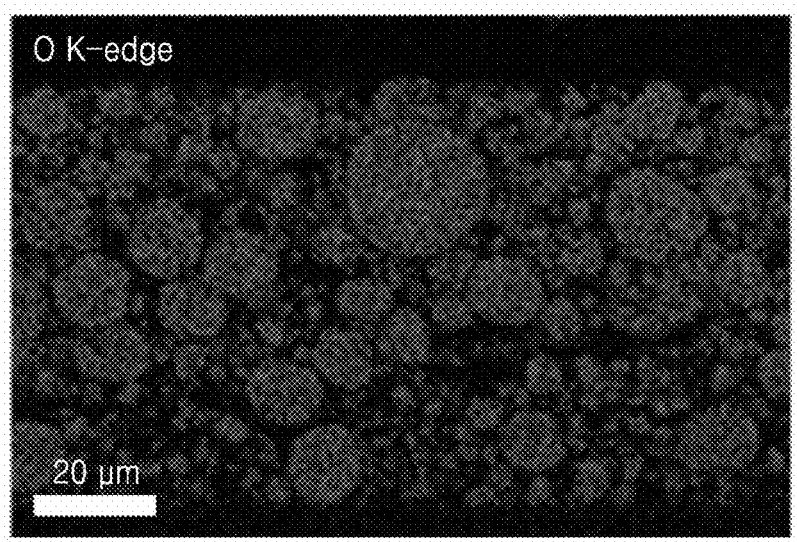
Figure 10E:
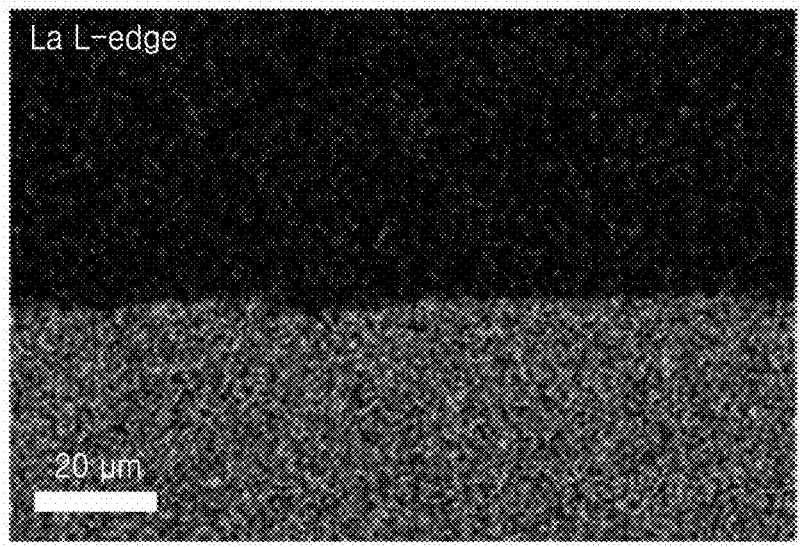
Figure 10F:
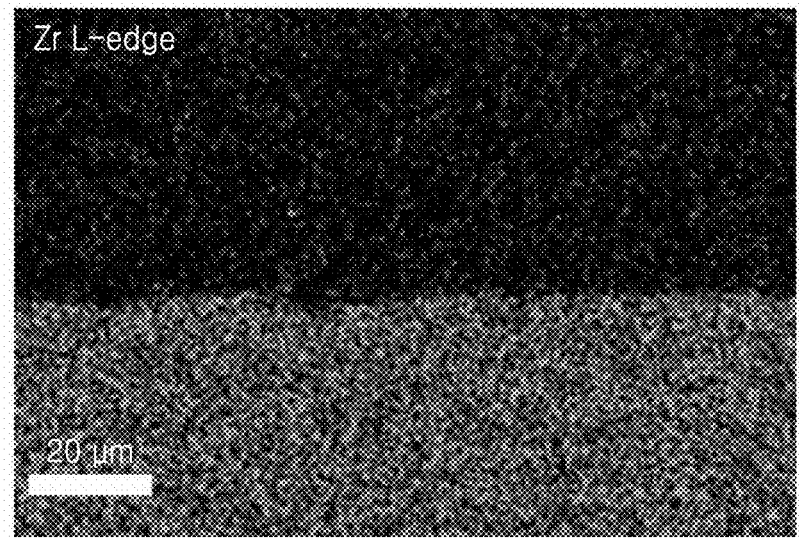

FIGS. 9A and 9B are SEM images showing the interfacial state of the cathode and the solid electrolyte (SE) and the interfacial state of the solid electrolyte (SE) and the LLZTO solid electrolyte, respectively. FIGS. 10A to 10F are images showing EDS analysis results, in which FIGS. 10A to 10C are to be compared with FIG. 9A, and FIGS. 10D to 10F are to be compared with FIG. 9B.

It was found that, as shown in FIG. 9A, the binding of the cathode and the solid electrolyte (SE) was well implemented, and the interface state and binding state of the solid electrolyte (SE) and the LLZTO solid electrolyte were good. Referring to FIGS. 10A to 10F, it was found that Ga, F, and Cl, which are components of the compound of Example 1, were uniformly distributed, and in particular were found to permeate into the porous cathode.

Evaluation Example 9: Charge and Discharge Profile

The solid secondary battery of Manufacture Example 1 was charged and discharged at a current rate of 0.2 mA/cm$^2$ at 60° C. in the voltage range of 2.85-4.2 V. The solid secondary battery was charged with a constant current of 0.067C for 15 hours until the battery voltage reached 4.2V, and then discharged with a constant current of 0.067C for 15 hours until the battery voltage reached 2.85V. A C rate is a measure of the rate a battery is charged or discharged relative to its maximum capacity. A 1C rate means a current which will discharge the entire capacity in one hour.

Figure 12:
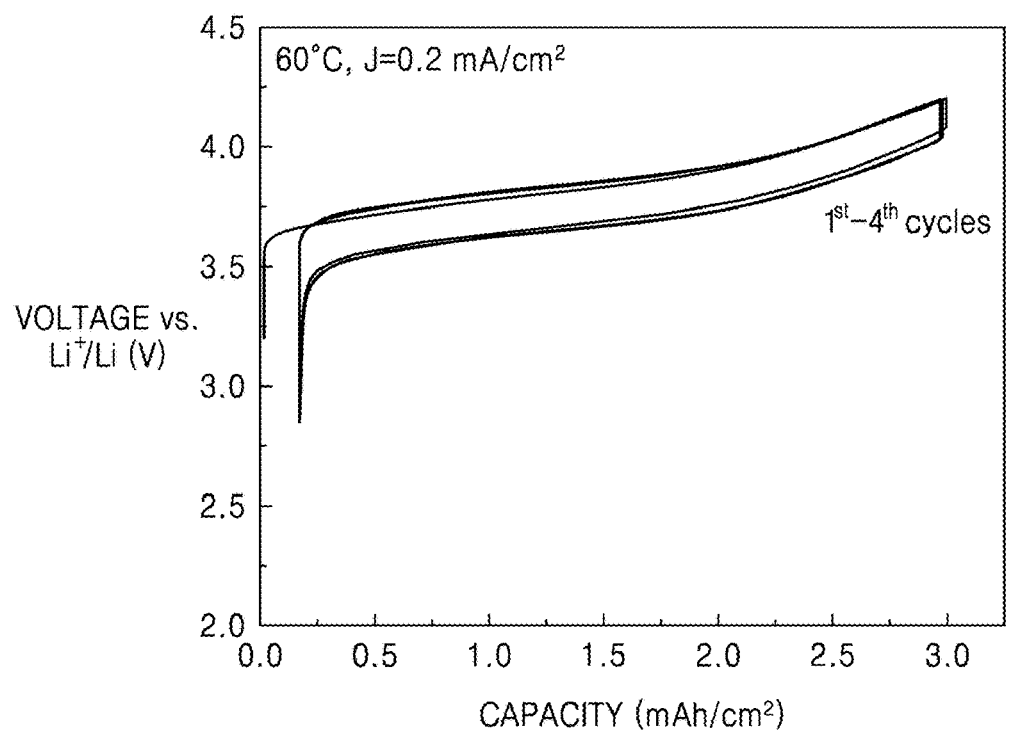
FIG. 12 is a graph of voltage (volts (V) vs. Li/Li$^+$) versus capacity (milliAmpere-hours per square centimeter (mAh/cm$^2$)) and illustrates a voltage profile of a solid secondary battery of Manufacture Example 1.
Figure 13:
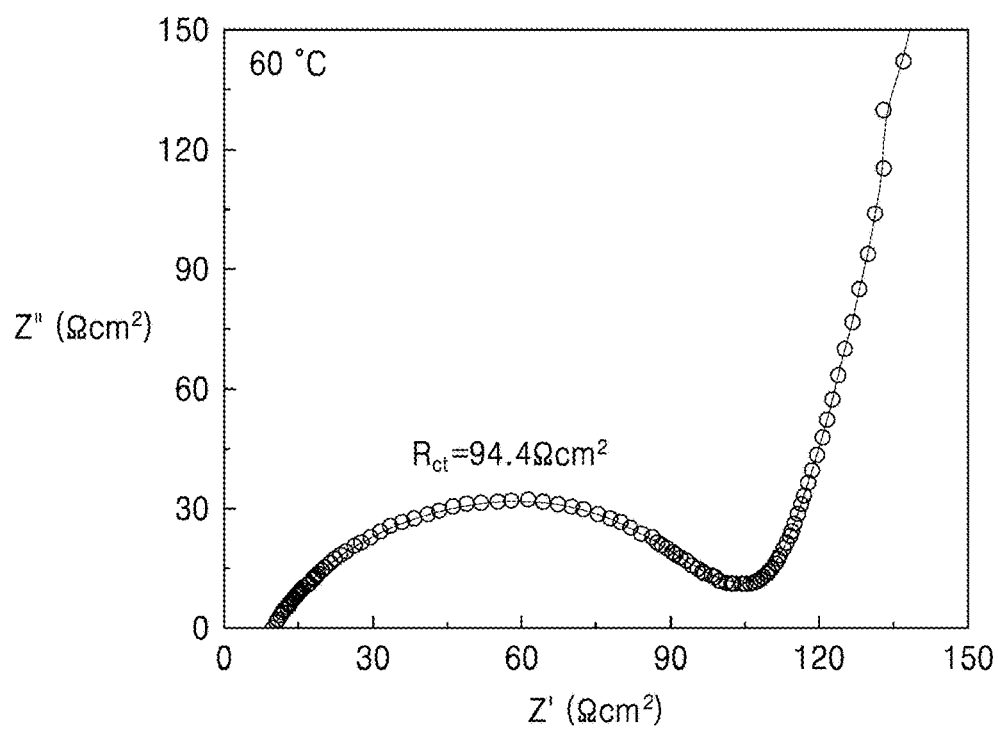
FIG. 13 is a graph of imaginary impedance (Z", ohms-cm$^2$) versus real impedance (Z', ohms cm$^2$) and illustrates impedance characteristics of the solid secondary battery of Manufacture Example 1 at 60° C.

A voltage profile after the charging and discharging is shown in FIG. 12. FIG. 13 illustrates impedance characteristics of the solid secondary battery at 60° C.

Referring to FIGS. 12 and 13, it was found that the solid electrolyte including the compound of Example 1 had excellent compatibility with a Garnet-based solid electrolyte. It was also found that the solid secondary battery of Manufacture Example 1 reversibly exhibited a capacity of about 3 mAh/cm$^2$ near a designed capacity of 3.2 mAh/cm$^2$.

Charge and discharge profiles of the batteries of Comparative Manufacture Examples 1 to 3 were evaluated, in the same manner as the method of evaluating the Charge and discharge profiles of the solid secondary battery of Manufacture Example 1.

As a result of the evaluation, the batteries of Comparative Manufacture Examples 1 to 3 were found to have poor characteristics, as compared with the secondary solid battery of Manufacture Example 1.

Evaluation Example 10: Charge-Discharge Profile and Cycle Characteristics

The solid secondary battery of Manufacture Example 2 and the solid secondary batteries of Comparative Manufacture Examples 1 to 3 were charged and discharged under the same conditions as those in Evaluation Example 8 at 60° C., a voltage range of 2.85-4.2 V, and a current rate of 0.3 mA/cm$^2$, and cycle characteristics of the solid secondary batteries were evaluated in a 60° C. thermostat.

After charging with a constant current of 0.1C for 10 hours until the battery voltage reached 4.2V, discharging was performed with a constant current of 0.1C for 20 hours until the battery voltage reached 2.85V (1$^{st}$ cycle).

Figure 14:
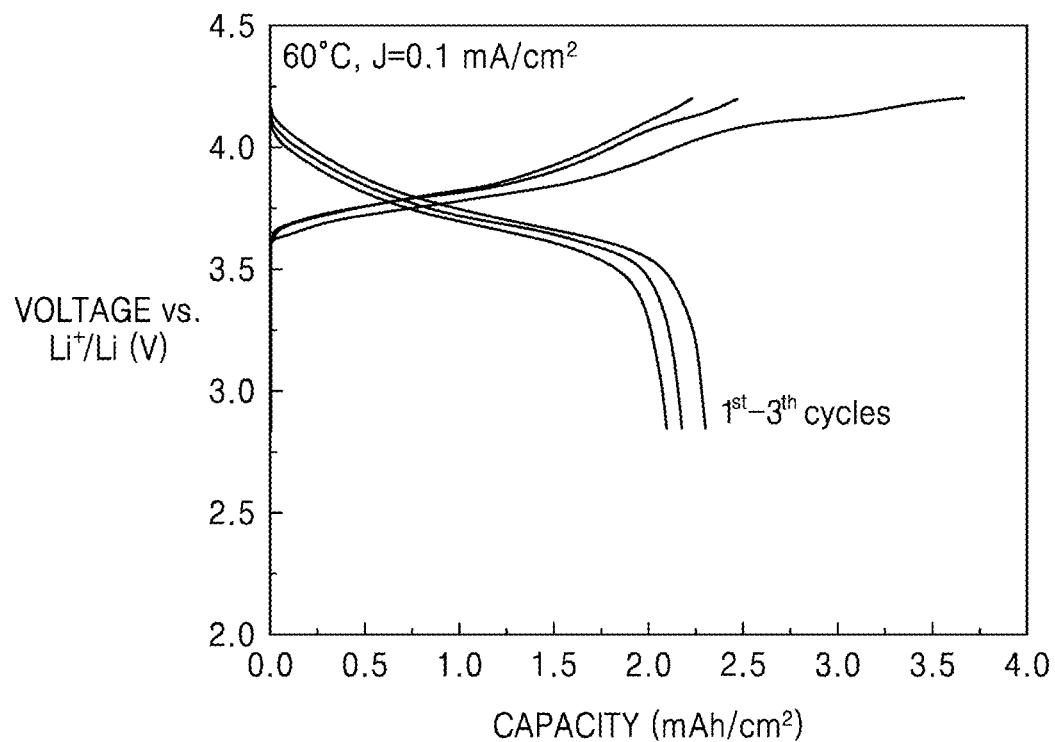
FIG. 14 is a graph of voltage (volts (V) versus Li/Li$^+$) versus capacity (mAh/cm$^2$) and illustrates a voltage profile of a solid secondary battery of Manufacture Example 2.
Figure 15:
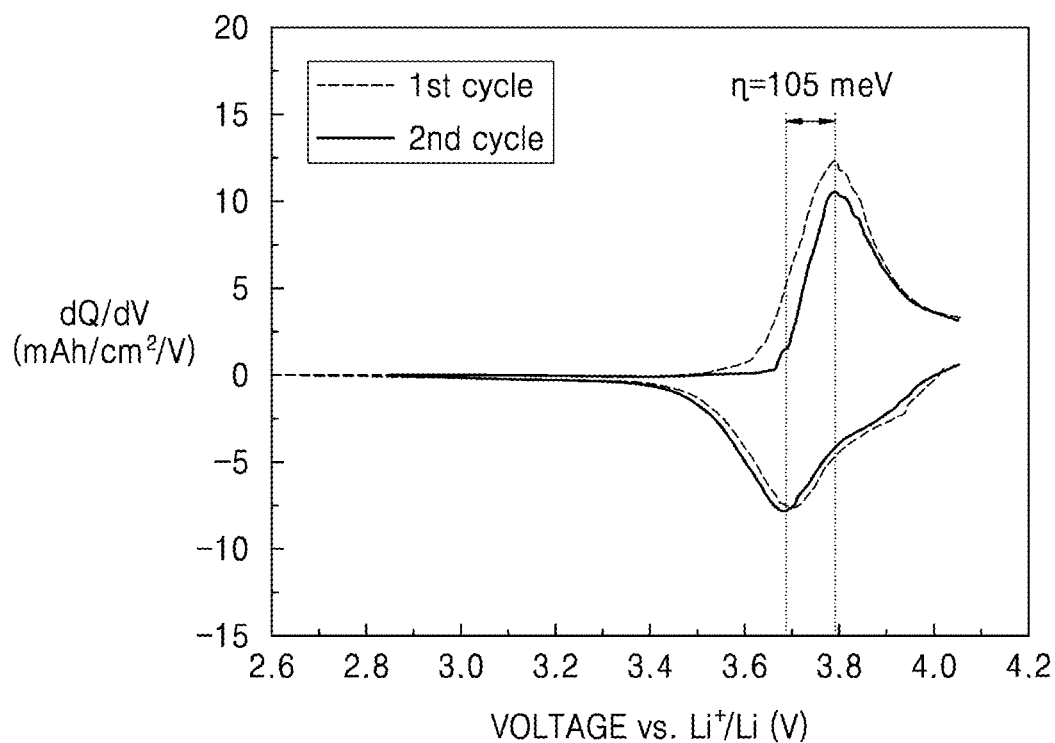
FIG. 15 is a graph of the derivative of capacity with respect to voltage (dQ/dV, mAh/cm$^2$/V)) versus voltage (V vs. Li/Li$^+$) showing cycle characteristics of a solid secondary battery of Manufacture Example 2.
Figure 16:
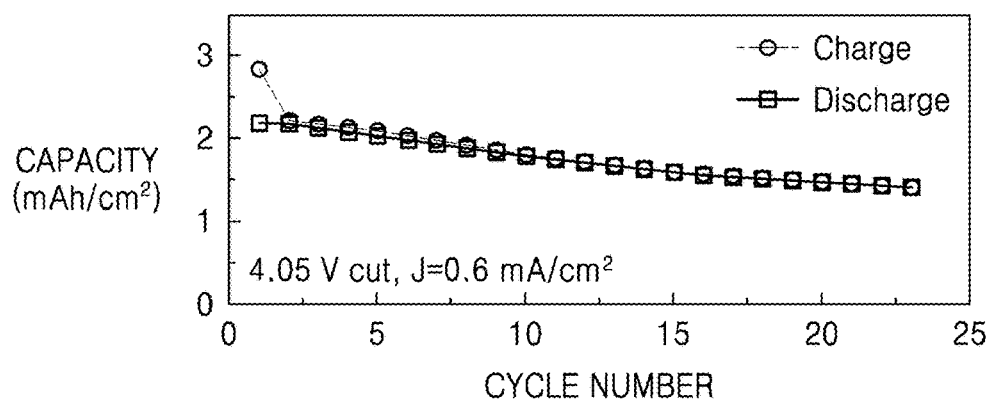
FIG. 16 is a graph of capacity (mAh/cm$^2$) versus cycle number and illustrates changes in capacity with respect to the number of cycles of the solid secondary battery of Manufacture Example 2.

A voltage profile and cycle characteristics after the 1$^{st}$ cycle of charging and discharging are shown in FIGS. 14 to 16, respectively.

Referring to FIG. 14, it was found that the solid secondary battery of Manufacture Example 2 had excellent compatibility with LLZO Garnet, and the solid electrolyte of the solid secondary battery of Manufacture Example lean be used as a solid electrolyte in a secondary battery.

Referring to FIG. 15, it was found that the solid secondary battery of Manufacture Example 2 could operate when the solid electrolyte is used as the solid electrolyte for a cathode.

Referring to FIG. 16, it was found that the solid secondary battery of Manufacture Example 2 exhibited good cycle characteristics.

Evaluation Example 11: Water Sensitivity

Change in ionic conductivity according to the introduction of moisture in the compound of Example 1 was observed. Changes in ionic conductivity when the compound was mixed with water in an amount of 10 wt %, 20 wt %, or 30 wt % were investigated. The results are shown in FIG. 7.

Figure 7:
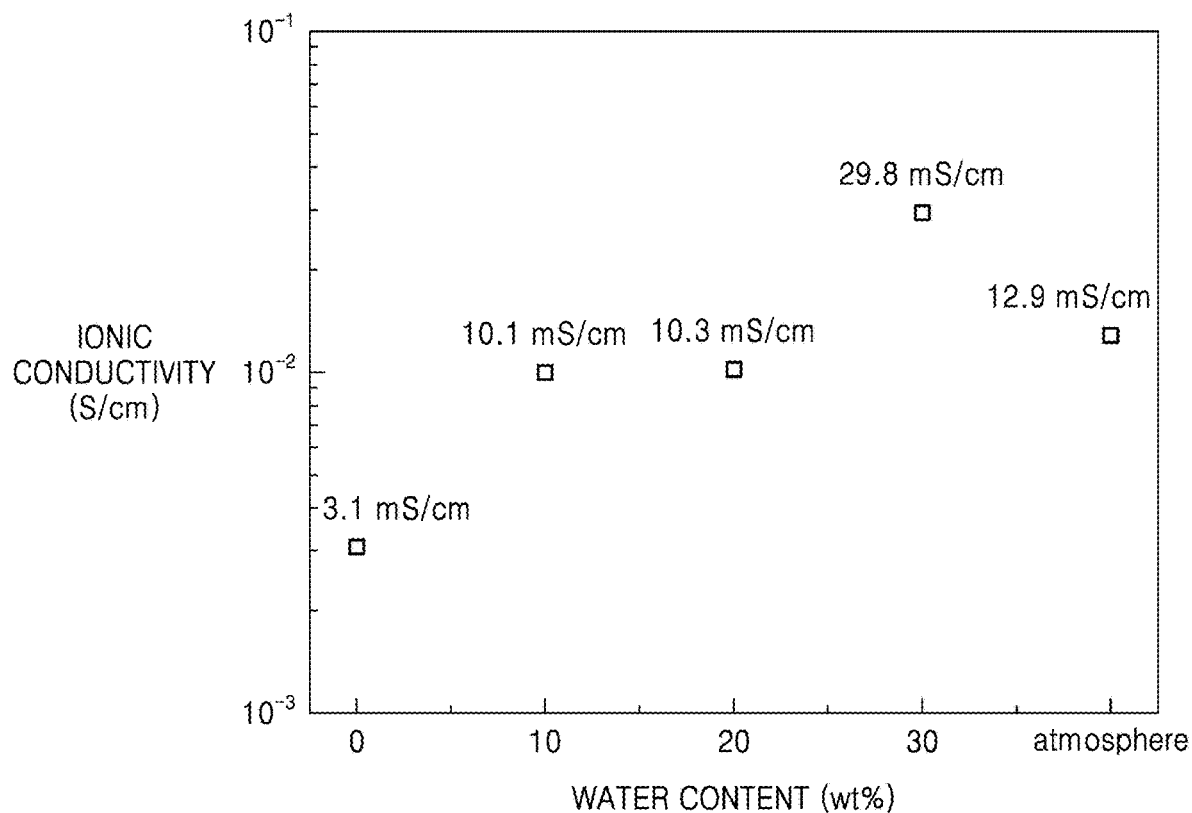
FIG. 7 is a graph of ionic conductivity (Siemens per centimeter (S/cm)) versus water content (weight percent (wt %)) and illustrates changes in ionic conductivity according to water content of a solid electrolyte including the compound of Example 1.

Referring to FIG. 7, when exposed to air, gellation through moisture absorption was observed. It was observed that the ionic conductivity of the solid electrolyte was increased when the water content was 10 wt %, 20 wt %, or 30 wt %.

Evaluation Example 12: Formability

The compound in clay form of Example 1 was evaluated for formability.

Figure 8A:
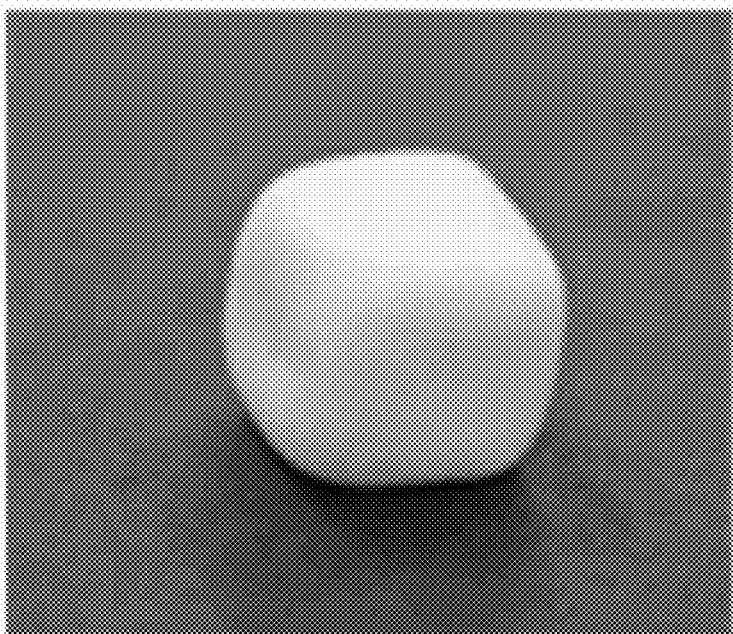
FIGS. 8A and 8B are images illustrating formability of the solid electrolyte including the compound of Example 1.
Figure 8B:

As shown in FIGS. 8A and 8B, it was possible to freely shape the compound of Example 1 as desired, like rubber or clay.

The compounds in powder form of Comparative Examples 9 to 13 were evaluated for formability.

As a result of the formability evaluation, the compounds of Comparative Examples 9 to 13 did not exhibit flexible properties, and it was difficult to shape the compounds as desired.

Evaluation Example 13: Thermogravimetric Analysis

Water contents of the compound (3LiCl—GaF$_3$) in clay form prepared in Example 2 and LiCl used as a starting material were measured by thermogravimetric analysis. The thermogravimetric analysis was performed using a TA instruments SDT-Q600 thermogravimetric analyzer (U.S.A) in air over a temperature range of 100° C. to 900° C. at a heating/cooling rate of 2° C. per minute.

Figure 20:
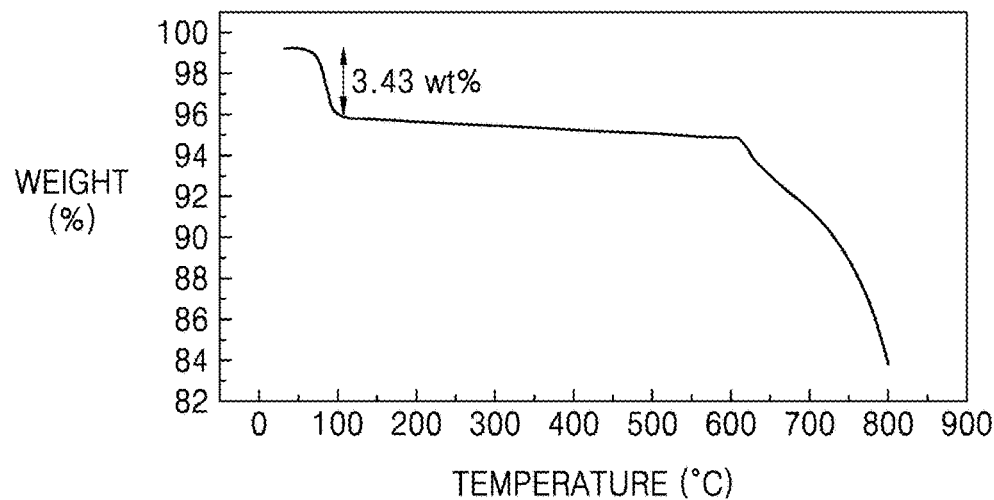
FIG. 20 is a graph of weight (percent, %) versus temperature (° C.) showing the results of thermogravimetric analysis of LiCl used as a starting material in Example 2.

The results of the thermogravimetric analysis of the starting material LiCl are shown in FIG. 20.

As a result of the thermogravimetric analysis, the starting material LiCl had a water content of about 3.43 wt % as shown in FIG. 20, and the compound (3LiCl—GaF$_3$) of Example 2 had a water content of about 1.7 wt %.

As described above, according to the one or more embodiments, a solid electrolyte may exhibit improved ionic conductivity at room temperature. The solid electrolyte may also have flexible and clay characteristics, and thus excellent formability, and thus may be useful in manufacturing flexible solid secondary batteries. The solid electrolyte may be used as a lithium ion conductor, and may be utilized as a cathode electrolyte due to having improved lithium stability and high oxidation potential.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid electrolyte comprising:
a compound represented by Formula 1 or Formula 3, wherein the compound represented by Formula 1 or Formula 3 has a glass transition temperature of −30° C. or less, and a glass or glass-ceramic structure $$AQX\text{—}Ga_{1-z}M_{z1}(F_{1-k}Cl_k)_{3-3z}Z_{3z1} \quad \text{Formula 1}$$

wherein, in Formula 1,
Q is Li or a combination of Li and Na, K, or a combination thereof,
M is a trivalent cation, or a combination thereof,
X is a halogen other than F, a pseudohalogen, OH, or a combination thereof,
Z is a monovalent anion, or a combination thereof,
$1<A<5$, $0≤z<1$, $0≤z1≤1$, and $0≤k<1$, $$AQX\text{-}aM_{z1}Z_{3z1}\text{-}bGa_{1-z}(F_{1-k}Cl_k)_{3-3z} \quad \text{Formula 3}$$

wherein, in Formula 3, Q is Li or a combination of Li and Na, K, or a combination thereof;
M is a trivalent cation, or a combination thereof,
X is a halogen other than F, pseudohalogen, OH, or a combination thereof,
Z is a monovalent anion, or a combination thereof,
$0<a≤1$, $0<b≤1$, $0<a+b$, $a+b=4−A$, $1<A<5$, $0≤z<1$, $0≤z1≤1$, and $0≤k<1$.

2. The solid electrolyte of claim 1, wherein the solid electrolyte has a loss modulus of about 100 Pascals or greater.

3. The solid electrolyte of claim 1, wherein the solid electrolyte has a water content of about 5 weight percent or less with respect to a total weight of the solid electrolyte.

4. The solid electrolyte of claim 3, wherein the solid electrolyte has a water content of about 0.1 weight percent to about 5 weight percent with respect to the total weight of the solid electrolyte.

5. The solid electrolyte of claim 1, wherein the compound represented by Formula 1 or Formula 3 comprises a compound represented by Formula 2:

$$ALiX\text{—}Ga_{1-z}M_{z1}(F_{1-k}Cl_k)_{3-3z}Z_{3z1} \quad \text{Formula 2}$$

wherein, in Formula 2, M is a trivalent cation, or a combination thereof,
X is a halogen other than F, pseudohalogen, OH, or a combination thereof,
Z is a monovalent anion, or a combination thereof,
$1<A<5$, $0≤z<1$, $0≤z1≤1$, and $0≤k<1$.

6. The solid electrolyte of claim 1, wherein in Formula 3: a and b are not both 1 at the same time, and $2<A<4$.

7. The solid electrolyte of claim 1, wherein the compound represented by Formula 1 or Formula 3 comprises a compound represented by Formula 4:

$$ALiX\text{-}aM_{z1}Z_{3z1}\text{-}bGa_{1-z}(F_{1-k}Cl_k)_{3-3z} \quad \text{Formula 4}$$

wherein, in Formula 4, M is a trivalent cation, or a combination thereof,
X is a halogen other than F, pseudohalogen, OH, or a combination thereof,
Z is a monovalent anion, or a combination thereof,
$0<a≤1$, $0<b≤1$, $0<a+b$, $a+b=4−A$, $1<A<4$, $0≤z<1$, $0≤z1≤1$, and $0≤k<1$.

8. The solid electrolyte of claim 1, wherein the solid electrolyte has a lithium-ion conductivity of about 0.1 mS/cm or greater at 25° C.

9. The solid electrolyte of claim 1, wherein, in Formula 1 or Formula 3, M is In, Sc, Al, Tl, Y, B, La, or a combination thereof.

10. The solid electrolyte of claim 1, wherein, in Formula 1 or Formula 3, Z is a halogen, a pseudohalogen, or a combination thereof.

11. The solid electrolyte of claim 1, wherein, in Formula 1 or Formula 3, X is Cl, Br, I, or a combination thereof, and Z is Cl, Br, I, SCN, OCN, CN, OH, N$_3$, or a combination thereof.

12. The solid electrolyte of claim 1, wherein the compound of Formula 1 or Formula 3 is one selected from compounds represented by Formulae 5 to 7:

$$ALiCl\text{—}GaF_3, \quad \text{Formula 5}$$

wherein, in Formula 5, A is 2, 3, or 4, $$ALiBr\text{—}GaF_3, \quad \text{Formula 6}$$

wherein, in Formula 6, A is 2, 3, or 4, $$ALiCl\text{-}aM_{z1}Z_{3z1}\text{-}bGaF_3, \quad \text{Formula 7}$$

wherein, in Formula 7, A is 2 or 3,
Z is Cl or OH,
M is La, In, Sc, Al, Tl, Y, B, La, or a combination thereof,
$0<a<1$, $0<b<1$, $0<a+b$, $a+b=4−A$, and $0≤z1≤1$.

13. The solid electrolyte of claim 1, wherein the compound represented by Formula 1 or Formula 3 is 2LiCl—GaF$_3$, 3LiCl—GaF$_3$, 4LiCl—GaF$_3$, 3LiBr—GaF$_3$, 2LiCl—LiOH—GaF$_3$, 3LiCl-0.1LaCl$_3$-0.9GaF$_3$, 3LiCl-0.1InCl$_3$-

0.9GaF$_3$, 3LiCl-0.1ScCl$_3$-0.9GaF$_3$, 3LiCl-0.1AlCl$_3$-0.9GaF$_3$, 3LiCl-0.1TlCl$_3$-0.9GaF$_3$, 3LiCl-0.1YCl$_3$-0.9GaF$_3$, 3LiCl-0.1BCl$_3$-0.9GaF$_3$, 2LiBr—GaF$_3$, 4LiBr—GaF$_3$, 2LiClO$_4$—GaF$_3$, 2LiClO$_4$—LiOH—GaF$_3$, 3LiCl—NaCl—GaF$_3$, 3LiCl-0.2LaCl$_3$-0.8GaF$_3$, 3LiCl-0.2InCl$_3$-0.8GaF$_3$, 3LiCl-0.3LaCl$_3$-0.7GaF$_3$, 3LiCl-0.3InCl$_3$-0.7GaF$_3$, 3LiCl-0.5LaCl$_3$-0.5GaF$_3$, 3LiCl-0.5InCl$_3$-0.5GaF$_3$, 3LiCl-0.2ScCl$_3$-0.8GaF$_3$, 3LiCl-0.3ScCl$_3$-0.7GaF$_3$, 3LiCl-0.5ScCl$_3$-0.5GaF$_3$, 3LiCl-0.2AlCl$_3$-0.8GaF$_3$, 3LiCl-0.3AlCl$_3$-0.7GaF$_3$, 3LiCl-0.5AlCl$_3$-0.5GaF$_3$, 3LiCl-0.2BCl$_3$-0.8GaF$_3$, 3LiCl-0.3BCl$_3$-0.7GaF$_3$, 3LiCl-0.5BCl$_3$-0.5GaF$_3$, 3LiCl-0.2TlCl$_3$-0.8GaF$_3$, 3LiCl-0.3TlCl$_3$-0.7GaF$_3$, 3LiCl-0.5TlCl$_3$-0.5GaF$_3$, 3LiCl-0.2YCl$_3$-0.8GaF$_3$, 3LiCl-0.3YCl$_3$-0.7GaF$_3$, 3LiCl-0.5YCl$_3$-0.5GaF$_3$, 2LiCl—GaF$_2$Cl, 4LiCl—GaF$_2$Cl, 3LiBr—GaF$_2$Cl, 2LiCl—LiOH—GaF$_2$Cl, 2LiCl-1NaCl—GaF$_3$, 2LiCl-1KCl—GaF$_3$, 3LiCl—GaF$_2$Cl, 2LiCl-0.1AlCl$_3$-0.9GaF$_3$, 2LiCl-0.1ScCl$_3$-0.9GaF$_3$, 2LiCl-0.1BCl$_3$-0.9GaF$_3$, 2LiCl-0.1YCl$_3$-0.9GaF$_3$, 4LiCl-0.1AlCl$_3$-0.9GaF$_3$, 4LiCl-0.1ScCl$_3$-0.9GaF$_3$, 4LiCl-0.1BCl$_3$-0.9GaF$_3$, 4LiCl-0.1YCl$_3$-0.9GaF$_3$, or a combination thereof.

14. The solid electrolyte of claim 1, wherein a Cl 2p peak of the compound represented by Formula 1 or Formula 3 has a binding energy of about 199 electron volts to about 203 electron volts, when measured by X-ray photoelectron spectroscopy.

15. The solid electrolyte of claim 1, wherein the compound represented by Formula 1 or Formula 3 exhibits a major peak at a diffraction angle of 25° 2θ to 35° 2θ and a minor peak at a diffraction angle of 48° 2θ to 65° 2θ, when determined by X-ray diffraction analysis with Cu Kα radiation.

16. The solid electrolyte of claim 1, wherein the compound represented by Formula 1 or Formula 3 has a peak at a diffraction angle of 29° 2θ to 31° 2θ, 33° 2θ to 35° 2θ, and 49° 2θ to 51° 2θ, when measured by X-ray diffraction analysis with Cu Kα radiation, or
has a peak at a diffraction angle of 29° 2θ to 31° 2θ, at 33° 2θ to 35° 2θ, at 59° 2θ to 61° 2θ, and at of 62° 2θ to 64° 2θ, when measured by X-ray diffraction analysis with Cu Kα radiation.

17. The solid electrolyte of claim 1, wherein the solid electrolyte has a storage modulus of about 100 megaPascals or less.

18. The solid electrolyte of claim 1, wherein the solid electrolyte has a thickness of about 100 micrometers or less.

19. The solid electrolyte of claim 1, wherein the solid electrolyte has an activation energy of about 200 millielectron-volts to about 500 millielectron-volts at 25° C.

20. The solid electrolyte of claim 1, wherein, when the solid electrolyte has a water content of about 10 weight percent to about 30 weight percent, and an ionic conductivity of the solid electrolyte is about 10 mS/cm or greater at 25° C.

21. The solid electrolyte of claim 1, wherein the compound represented by Formula 1 or Formula 3 has clay characteristics at about −60° C. to about 160° C.

22. The solid electrolyte of claim 1, wherein, when the compound represented by Formula 1 or Formula 3 has a glass-ceramic structure, a ceramic content of the compound is about 0.1 weight percent to 30 weight percent, based on a total weight of the solid electrolyte.

23. A protected cathode comprising:
a cathode; and
a layer comprising the solid electrolyte of claim 1 on the cathode.

24. An electrochemical device comprising the solid electrolyte of claim 1.

25. The electrochemical device of claim 24, wherein the electrochemical device is an electrochemical battery, an accumulator, a supercapacitor, a fuel cell, a sensor, or an electrochromic device.

26. An electrochemical battery comprising:
a cathode;
an anode, and the solid electrolyte of claim 1 disposed between the cathode and the anode.

27. The electrochemical battery of claim 25, wherein the cathode comprises the compound represented by Formula 1 or Formula 3.

28. The electrochemical battery of claim 26, wherein the anode comprises lithium metal or a lithium alloy.

29. The electrochemical battery of claim 26, wherein the solid electrolyte is in a form of an electrolyte protective film, a cathode protective film, an anode protective film, a catholyte, or a combination thereof.

30. The electrochemical battery of claim 26, wherein the electrochemical battery is a solid secondary battery,
the solid secondary battery further comprises an oxide solid electrolyte and has a cathode/solid electrolyte/oxide solid electrolyte/lithium anode structure; or
the solid secondary battery further comprises an ionic liquid-containing electrolyte and an oxide solid electrolyte and has a cathode/ionic liquid-containing electrolyte/oxide solid electrolyte/solid electrolyte/oxide solid electrolyte/lithium anode structure.

31. The electrochemical battery of claim 30, wherein the oxide solid electrolyte is a garnet ceramic of the formula Li$_{3+x}$La$_3$M$_2$O$_{12}$, wherein M is Te, Nb, or Zr, and x is an integer of 1 to 10, a lithium phosphorus oxynitride of the formula Li$_x$PO$_y$N$_z$, wherein 0<x<1, 0<y<1, and 0<z<1, Li$_x$P$_y$O$_z$N$_K$ wherein 2.7≤x≤3.3, 0.8≤y≤1.2, 3.5≤z≤3.9, and 0.1≤k≤0.5, Li$_w$PO$_x$N$_y$S$_z$ wherein 0<w<1, 0<x<1, 0<y<1, and 0<z<1, Li$_{1+x+y}$Al$_x$Ti$_{2-x}$Si$_y$P$_{3-y}$O$_{12}$ wherein 0<x<2 and 0≤y<3, BaTiO$_3$, Pb(Zr$_x$Ti$_{1-x}$)O$_3$ wherein 0≤x≤1, Pb$_{1-x}$La$_x$Zr$_{1-y}$Ti$_y$O$_3$ wherein 0≤x<1 and 0≤y<1, Pb(Mg$_{1/3}$Nb$_{2/3}$)O$_3$—PbTiO$_3$, HfO$_2$, SrTiO$_3$, SnO$_2$, CeO$_2$, Na$_2$O, MgO, NiO, CaO, BaO, ZnO, ZrO$_2$, Y$_2$O$_3$, Al$_2$O$_3$, TiO$_2$, SiO$_2$, SiC, Li$_3$PO$_4$, Li$_x$Ti$_y$(PO$_4$)$_3$ (wherein 0<x<2 and 0<y<3, Li$_x$Al$_y$Ti$_z$(PO$_4$)$_3$ wherein 0<x<2, 0<y<1, and 0<z<3, Li$_{1+x+y}$(Al$_a$Ga$_{1-a}$)$_x$(Ti$_b$Ge$_{1-b}$)$_{2-x}$Si$_y$P$_{3-y}$O$_{12}$ wherein 0≤x≤1, 0≤y≤1, 0≤a≤1, and 0≤b≤1, Li$_x$La$_y$TiO$_3$ wherein 0<x<2 and 0<y<3, Li$_x$Ge$_y$P$_z$S$_w$ wherein 0<x<4, 0<y<1, 0<z<1, and 0<w<5, Li$_x$N$_y$ wherein 0<x<4 and 0<y<2, Li$_x$Si$_y$S$_z$ wherein 0<x<3, 0<y<2, and 0<z<4, Li$_x$P$_y$S$_z$ wherein 0<x<3, 0<y<3, and 0<z<7, Li$_2$O, LiF, LiOH, Li$_2$CO$_3$, LiAlO$_2$, a Li$_2$O—Al$_2$O$_3$—SiO$_2$—P$_2$O$_5$—TiO$_2$—GeO$_2$ ceramic, or a combination thereof.

32. A method of preparing the solid electrolyte claim 1, the method comprising:
providing
a mixture of QX and Ga$_{1-z}$(F$_{1-k}$Cl$_k$)$_{3-3z}$,
a mixture of QX, M$_{z1}$Z$_{3z1}$, and Ga$_{1-z}$(F$_{1-k}$Cl$_k$)$_{3-3z}$, or
a mixture of QX and Ga$_{1-z}$M$_{z1}$(F$_{1-k}$Cl$_k$)$_{3-3z}$Z$_{3z1}$; and
mechanically milling the mixture to prepare a compound represented by Formula 1 or 3.

33. The method of claim 32, further comprising, after the mechanical milling, standing the mechanically milled mixture.

34. The method of claim 33, wherein by leaving the mixture to stand, a temperature of the mixture having undergone the mechanical milling is controlled to be 80° C. or less.

35. The method of claim 32, wherein the mechanical milling is ball milling, air jet milling, bead milling, roll milling, hand milling, planetary ball milling, stirred ball milling, vibrating milling, mechanofusion milling, shaker milling, planetary milling, attritor milling, disk milling, shape milling, NAUTA milling, NOBILTA milling, high-speed mixing, or a combination thereof.

36. The method of claim 32, wherein the mechanical milling is high energy milling, and the high energy milling is performed at about 400 rpm to about 900 rpm.

37. The method of claim 32, wherein
QX is LiX or a mixture of LiX and NaX, KX, or a combination thereof;
LiX is LiCl, LiBr, LiOH, LiClO$_4$, or a combination thereof;
NaX is NaCl, NaBr, or a combination thereof,
KX is KCl, KBr, or a combination thereof;
$M_{z1}Z_{3z1}$ is LaCl$_3$, InCl$_3$, AlCl$_3$, YCl$_3$, TlCl$_3$, ScCl$_3$, BCl$_3$, or a combination thereof;
$Ga_{1-z}(F_{1-k}Cl_k)_{3-3z}$ is GaF$_3$; and
$Ga_{1-z}M_{z1}(F_{1-k}Cl_k)_{3-3z}Z_{3z1}$ is LaCl$_3$GaF$_3$, InCl$_3$GaF$_3$, AlCl$_3$GaF$_3$, YCl$_3$GaF$_3$, TlCl$_3$GaF$_3$, ScCl$_3$GaF$_3$, BCl$_3$GaF$_3$, or a combination thereof.

\* \* \* \* \*